US009727247B2

(12) United States Patent
Ogawa

(10) Patent No.: US 9,727,247 B2
(45) Date of Patent: Aug. 8, 2017

(54) STORAGE DEVICE AND METHOD, AND STORAGE MEDIUM

(71) Applicant: NEC Corporation, Minato-ku, Tokyo (JP)

(72) Inventor: Shugo Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 33 days.

(21) Appl. No.: 14/772,892

(22) PCT Filed: Mar. 17, 2014

(86) PCT No.: PCT/JP2014/057154
§ 371 (c)(1),
(2) Date: Sep. 4, 2015

(87) PCT Pub. No.: WO2014/142337
PCT Pub. Date: Sep. 18, 2014

(65) Prior Publication Data
US 2016/0011787 A1    Jan. 14, 2016

(30) Foreign Application Priority Data

Mar. 15, 2013   (JP) ................................ 2013-053646

(51) Int. Cl.
*G06F 3/06*   (2006.01)
(52) U.S. Cl.
CPC ............ *G06F 3/0608* (2013.01); *G06F 3/061* (2013.01); *G06F 3/0619* (2013.01);
(Continued)
(58) Field of Classification Search
CPC ....... G06F 3/061; G06F 3/0631; G06F 3/0685
See application file for complete search history.

(56) References Cited

U.S. PATENT DOCUMENTS

| 6,377,500 B1* | 4/2002 | Fujimoto ............ G06F 12/0246 365/230.01 |
| 2006/0075187 A1* | 4/2006 | Nakashima ........... G06F 3/0608 711/113 |
| 2013/0024613 A1 | 1/2013 | Benhase et al. |

FOREIGN PATENT DOCUMENTS

| JP | 09-006678 A | 1/1997 |
| JP | 2918531 B1 | 7/1999 |

(Continued)

OTHER PUBLICATIONS

Qureshi et al., "Utility-Based Cache Partitioning: A Low-Overhead, High-Performance, Runtime Mechanism to Partition Shared Caches", Proceedings of the 39th Annual International Symposium on Microarchitecture, pp. 423-432, 2006, cited in the Specification.

(Continued)

*Primary Examiner* — Edward Dudek, Jr.

(57) ABSTRACT

In order to enable an improvement in the access performance of a storage, a storage includes first and second storage devices respectively including first and second storage units to and from each of which data can be written and read, the speed of the first storage device is higher than or equal to that of the second storage device, the first storage device further includes a first storage area for storing management information for access control and management of the second storage unit, the second storage device further includes a second storage area for storing management information for access control and management of the second storage unit, and the storage includes an access control unit which retrieves the management information relating to the second storage unit and used for access to the second storage unit from the first storage area of the first storage device, and retrieves the management information relating to the second storage unit from the second storage area of the second storage device when the management (Continued)

information is not stored in the first storage area, and a capacity control unit which variably sets the allocation between the capacity of the first storage unit and the capacity of the first storage area in the first storage device.

19 Claims, 19 Drawing Sheets

(52) U.S. Cl.
CPC .......... *G06F 3/0631* (2013.01); *G06F 3/0641* (2013.01); *G06F 3/0665* (2013.01); *G06F 3/0674* (2013.01); *G06F 3/0689* (2013.01)

(56) References Cited

FOREIGN PATENT DOCUMENTS

| JP | 2005-285058 A | 10/2005 |
| JP | 2006-107054 A | 4/2006 |
| JP | 4819369 B2 | 8/2006 |
| JP | 2012-014435 A | 1/2012 |
| JP | 2012-078941 A | 4/2012 |

OTHER PUBLICATIONS

International Search Report for PCT Application No. PCT/JP2014/057154, mailed on May 13, 2014.
English translation of Written opinion for PCT Application No. PCT/JP2014/057154. Dec. 2, 2016.

* cited by examiner

| HIGH-ORDER CACHE LOWER LIMIT CAPACITY (MB) | 256 | 512 | 768 | 1024 | 1280 | 1536 | 1792 | 2048 | CONSTANT MISSES |
|---|---|---|---|---|---|---|---|---|---|
| FREQUENCY OF ACCESS | 10000 | 4000 | 3500 | 3000 | 1000 | 500 | 300 | 100 | 7600 |

251

(B)

| D-Partition LOWER LIMIT CAPACITY (MB) | 256 | 512 | 768 | 1024 | 1280 | 1536 | 1792 | 2048 | CONSTANT MISSES |
|---|---|---|---|---|---|---|---|---|---|
| FREQUENCY OF ACCESS | 25000 | 2000 | 1000 | 500 | 400 | 100 | 0 | 0 | 1000 |

| TYPE OF CACHE HIT | TIME BY WHICH ACCESS TIME IS SHORTENED PER ACCESS RELATIVE TO HIT IN LOW-ORDER CACHE |
|---|---|
| HIT IN HIGH-ORDER CACHE | 200us |
| HIT IN D-Partition | 100us |

| HIGH-ORDER CACHE LOWER LIMIT CAPACITY (MB) | 256 | 512 | 768 | 1024 | 1280 | 1536 | 1792 | 2048 | CONSTANT MISSES |
|---|---|---|---|---|---|---|---|---|---|
| FREQUENCY OF HITS IN EXEMPLARY EMBODIMENT | 10000 | 4000 | 3500 | 3000 | 1000 | 500 | 300 | 100 | 7600 |

71

(B)

| D-Partition LOWER LIMIT CAPACITY (MB) | 256 | 512 | 768 | 1024 | 1280 | 1536 | 1792 | 2048 | CONSTANT MISSES |
|---|---|---|---|---|---|---|---|---|---|
| FREQUENCY OF HITS IN EXEMPLARY EMBODIMENT | 25000 | 2000 | 1200 | 400 | 300 | 100 | 0 | 0 | 1000 |

| HIGH-ORDER CACHE CAPACITY (MB) | 0 | 256 | 512 | 768 | 1024 | 1280 | 1536 | 1792 | 2048 |
|---|---|---|---|---|---|---|---|---|---|
| D-Partition CAPACITY (MB) | 2048 | 1792 | 1536 | 1280 | 1024 | 768 | 512 | 256 | 0 |
| FREQUENCY OF HITS IN HIGH-ORDER CACHE | 0 | 10000 | 14000 | 17500 | 20500 | 21500 | 22000 | 22300 | 22400 |
| FREQUENCY OF HITS IN D-Partition | 29000 | 19000 | 15000 | 11400 | 8100 | 6700 | 5000 | 2700 | 0 |
| ACCESS TIME SHORTENING EFFECT (ms) | 2900 | 3900 | 4300 | 4640 | 4910 | 4970 | 4900 | 4730 | 4480 |

Fig. 11

223 ANCESTOR DIRECTORY INFORMATION

| INVALID | D-Partition | PAGE ADDRESS | STORAGE LOCATION ADDRESS | UPDATED | PRIORITY LEVEL OF REPLACEMENT |
|---|---|---|---|---|---|
| No | No | 100 | 1 | No | 1 |
| No | Yes | 0 | 2 | Yes | 2 |
| No | No | 400 | 3 | No | 3 |
| No | No | 200 | 4 | Yes | 2 |
| No | Yes | 1 | 5 | No | 1 |
| Yes | | | 6 | | |
| ... | ... | ... | ... | ... | ... |

Fig. 12

2321 SUBORDINATE DIRECTORY INFORMATION

| INVALID | PAGE ADDRESS | STORAGE LOCATION ADDRESS | UPDATED | PRIORITY LEVEL OF REPLACEMENT |
|---|---|---|---|---|
| No | 0 | 1 | No | 3 |
| No | 100 | 2 | Yes | 4 |
| No | 400 | 3 | No | 1 |
| No | 200 | 4 | No | 2 |
| No | 1 | 5 | Yes | 5 |
| Yes |  | 6 |  |  |
| ... | ... | ... | ... | ... |

STORAGE DEVICE AND METHOD, AND STORAGE MEDIUM

CROSS-REFERENCE TO RELATED APPLICATION

This application is a National Stage Entry of PCT/JP2014/057154 filed on Mar. 17, 2014, which claims priority from Japanese Patent Application 2013-053646 filed on Mar. 15, 2013, the contents of all of which are incorporated herein by reference, in their entirety.

TECHNICAL FIELD

The present invention relates to a storage device and method, and a program.

BACKGROUND ART

With the development of information and communications technology and the expansion of its field of application, an increasing volume of data is being processed by information processing systems. With the increasing variety and number of information processing systems, storages for storing the data processed by the information processing systems are requiring improvements in capacity and performance.

To improve the efficiency of managing the storages, it is often the case that, for example, the data involved in a plurality of systems are concentrated on a single storage. In this case, the data involved in a plurality of systems are stored in a single storage. Thus, the single storage requires a storage capacity large enough to store mass data and a performance high enough to process a large amount of access from the plurality of systems. In recent years, the capacity of HDDs (Hard Disk Drives) is remarkably increasing. The use of HDDs as storage media can meet the requirements concerning the increase in storage capacity. Changing the number of storage media which constitute the single storage can also meet the requirements regarding the storage capacity as needed.

To meet the performance requirements presented to the storages, that is, to achieve access speedup, caches are employed. Although not particularly limited, the caches for the storages are implemented in, for example, DRAMs (Dynamic Random Access Memories). The caches for the storages store copies or updates of the data stored in storage media such as HDDs. Storing frequently accessed data in the caches for the storages (to be also simply referred to as "caches" hereinafter) reduces the amount of access to storage media such as HDDs having an access performance lower than DRAMs and the like. This improves the access performance of the storage system.

A hierarchical cache architecture is known to be available in the storages. This architecture is used to hierarchically organize a plurality of caches having different access times and store frequently accessed data, in turn, from higher-order caches having shorter access times. The hierarchical cache architecture uses an SSD (Solid State Drive) as a storage medium higher in performance than a general HDD. The SSD is implemented in, for example, a NAND (Negative AND) flash memory. The SSD has an access performance lower than that of a DRAM but higher than that of an HDD. The SSD has a capacity smaller than that of an HDD, but is larger in capacity and costs less than a DRAM.

In the hierarchical cache architecture, high-speed storage media typified by SSDs or the like are used for low-order caches. DRAMs or the like are used for high-order caches. The low-order caches store data which exceeds the capacity of any high-order cache (for example, data thrown out of any high-order cache by replacement or the like). In accessing again the data that is thrown out of any high-order cache and stored in any low-order cache, the low-order cache is accessed. This reduces the frequency of access to storage media such as HDDs in the storages, thus improving the access performance. The following processes are executed alternately between the high- and low-order caches:

(a) data hit in any low-order cache is stored in any high-order cache again; and (b) when any high-order cache has reached its full capacity, data that is acquired from any low-order cache and stored in the high-order cache is thrown out of the high-order cache and stored in the low-order cache again.

In the hierarchical cache architecture, the above-mentioned series of operations of (a) and (b) is repeated. As a result, the most frequently accessed data is stored in any high-order cache; and the second most frequently accessed data after the one stored in the high-order cache is stored in any low-order cache.

The caches are efficiently used in this way.

When a plurality of types of data are stored in the caches, partitioning is employed to prevent cache competition between the individual data. See, for example, PTL 1 or NPL 1 for details of the partitioning. The partitioning is also proposed in, for example, caches for CPUs (Central Processing Units). For example, competition between processes (or threads) is prevented by dividing (partitioning) shared caches into partitions serving as process- (or thread-) specific occupied areas and limiting the capacity.

In the caches for the storages, the partitioning means, in most cases, dividing (partitioning) the caches into partitions each serving as an area occupied by a volume (this is a predetermined data set defining the unit of management of storage areas and is also called a "logical volume") or the like, which is used as a unit.

If access to a given volume results in a cache miss, data corresponding to the access is registered in any cache. Without the partitioning, another volume of data already stored in the cache is thrown out, causing cache competition. In contrast to this, when the caches are partitioned, if access to a given volume results in a miss within a partition corresponding to this volume, the data (page) is replaced within the partition and no data in another partition corresponding to an area occupied by another volume is thrown out. This prevents cache competition between the volumes.

The applicant of the present invention searched for related patent documents and retrieved PTLs 2 to 5. Among these patent documents, PTL 2 discloses a configuration which exclusively uses caches for a DBMS (Data Base Management System) and caches for a storage device and divides these caches using data to optimize the allocation, thereby efficiently using the data caches of the storage device. PTL 2 discloses: additionally estimating the cache hit count upon an increase in size of storage areas allocated to the divided caches.

PTL 3 discloses a disk array device including a plurality of hard disk units and having the following configuration. A mass memory mounted on a controller module which controls the overall disk array device has a system area managed by an OS (Operating System), a cache area serving as a cache memory, and a table area which stores management/control information relating to the device and whose size is changeable at any point of time. The table area is changed in an active state in accordance with the device state without power ON/OFF and an unused area of the table area is freed to be available as a cache area to appropriately change the sizes of the table area and cache area in an active state during operation.

PTL 4 discloses a configuration which uses a memory for an RAID (Redundant Array of Inexpensive Disks) controller and an SSD. The memory for the RAID controller includes an area for storing cache management information and a temporary cache area to function as a primary cache for an external storage device (HDD) (a cache memory (primary cache) for a host system). The SSD functions as a secondary cache and includes a cache area and an area for storing cache management information.

PTL 5 discloses a configuration for dynamically calculating a probability of an access caused by a hierarchical storage device for each hierarchical level. The hierarchical storage device includes storage devices, which have different access speeds and are hierarchically connected to each other will be accessed. Whether to expand the storage hierarchy is determined by calculating the access speed in the entire hierarchical storage device by an access speed calculation unit using access patterns recorded in an access information management unit and the expanded system configuration. The access speed of the storage device is obtained by multiplying the data transfer speed at each hierarchical level and the proportion of data present at each hierarchical level, calculated from the past access log.

CITATION LIST

Patent Literature

PTL 1: Japanese Patent Publication No. 4819369
PTL 2: Japanese Patent Application Laid-Open Publication No. 2005-285058
PTL 3: Japanese Patent Application Laid-Open Publication No. 2006-107054
PTL 4: Japanese Patent Application Laid-Open Publication No. 2012-078941
PTL 5: Japanese Patent Application Laid-Open Publication No. H09-006678

Non Patent Literature

NPL 1: Qureshi et al., "Utility-Based Cache Partitioning: A Low-Overhead, High-Performance, Runtime Mechanism to Partition Shared Caches", Proceedings of the 39th Annual International Symposium on Microarchitecture, pp. 423-432, 2006

SUMMARY OF INVENTION

Technical Problem

An analysis result obtained by the inventor of the present invention will be given below.

In various storages including hierarchical caches, storage media are accessed in turn from the high-speed, highest-order caches to the lower-order caches. In a storage having a hierarchical architecture involving, for example, two levels: high- and low-order caches, hit determination is performed in the high-order cache, such as a DRAM, in response to an access request. If it is determined as a result of the hit determination that a miss is encountered (no hit is obtained) in the high-order cache, hit determination is further performed in the low-order cache, such as an SSD.

Management information for access control/management of each cache includes, for example,
the addresses of data storage locations in the cache,
the logical addresses on the HDD designated by access requests, and
the priority level information of replacement used in an algorithm for throwing out pages, or the like. A page or pages are the unit of cache management. Although not particularly limited, the page size takes a predetermined value of, for example, 4 KB (kilobytes) or 8 KB.

In this description, management information for controlling and managing each cache is referred to as "directory information." The directory information is referred to/updated in, for example, determining whether the access target is stored (hit) in the cache in question or not stored (missed) in the cache in question, in response to an access request.

In a cache control unit (for example, a cache access control unit), a hit determination process of determining whether the access target is registered in the cache in question by referring to the directory information in response to an access request is always performed before actual data read or write.

In the cache control unit (for example, the access control unit), this directory information is also referred to/updated when read or write access is executed to the data storage area of the cache in question in accordance with the cache hit/miss determination result.

This means that the directory information of each cache is accessed more frequently than the data storage area of this cache.

The foregoing description reveals that improving the access performance of the storage requires storing both data and directory information in a high-speed storage medium (for example, a high-speed cache) such as a DRAM.

In the storage having the hierarchical cache architecture, the cache control unit (access control unit) performs hit determination in the low-order cache by referring to the directory information of the low-order cache when a miss has occurred in the high-order cache.

The performance of the cache hit determination process influences the access response time of the storage. This makes it necessary to speed up the hit determination process by storing the directory information of the low-order cache in a high-speed storage medium such as a DRAM.

However, the use of a configuration (prototype example; reference example) which stores all the directory information of the low-order cache in a storage medium identical to a high-order cache such as a DRAM is considered to pose the following problem in terms of the capacity of the storage medium.

Access to the caches is controlled in units of pages. Therefore, information associated with pages which constitute each cache accounts for a large share of the directory information of this cache. The page count of the cache is proportional to the capacity of the cache. Accordingly, as the capacity of the cache increases, the page count increases and the volume of the directory information of the cache, in turn, increases.

To speed up the hit determination process in the low-order cache, a configuration (prototype example) which stores all or most of the directory information of the low-order cache in a high-speed storage medium like the high-order cache will be examined.

In this case, with an increase in volume of the directory information of the low-order cache, the capacity of the data storage area in the high-order cache may become insufficient.

If the data storage area in the high-order cache runs short or runs out (the area for storing data runs out), the frequency of hits in the high-order cache extremely lowers.

In other words, the hit determination process in the low-order cache performed by referring to the directory information of the low-order cache itself is, indeed, speeded up by recording this directory information on a high-speed storage medium such as a DRAM. However, the frequency of hits in the high-order cache extremely lowers (misses are almost always determined in the high-order cache).

Determining frequent misses in the high-order cache increases the frequency of access to the low-order cache.

Data hit in the low-order cache is stored in the high-order cache again. Hence, an increase in frequency of access to the low-order cache, in turn, increases the frequency of, for example, page replacement for reserving empty areas in the high-order cache to store the data of the low-order cache. This rather leads to degradation in access performance of the caches as a whole.

To solve the problem that storing all or nearly all the directory information of the low-order cache in a high-speed storage medium such as a DRAM causes shortage in capacity of the data storage area in the high-order cache, it may be possible to increase the capacity of the high-speed storage medium, such as a DRAM. In this case, however, the high-speed storage medium, such as a DRAM, requires a very large capacity, and this technique can therefore hardly be practiced in terms of cost and other factors.

In other words, in a storage (prototype example, reference example) including at least:

a first storage device including a first storage unit (for example, a high-order cache) having data written in it and read from it; and a second storage device including a second storage unit (for example, a low-order cache) having data written in it and read from it, wherein the first storage device is equal in speed to or more rapid than the second storage device and access is performed from the side of the first storage device in response to an access request, the following problem is posed.

When a configuration which stores in the first storage device, management information (directory information) for access control and management of the second storage unit (for example, a low-order cache) is employed to speed up access to the second storage device, a sufficient area cannot be reserved in the first storage unit that stores data in the first storage device. This makes it difficult to speed up access in the entire storage.

When the above-mentioned problem is solved by increasing the capacity of the first storage device, the first storage device (first storage unit) requires a very large capacity, and this technique can hardly be practiced in terms of cost and other factors.

It is an exemplary object of the present invention to solve the above-mentioned problem and provide a device, a method, and a program which can improve the access performance of a storage.

Solution to Problem

A storage device according to one aspect of the present invention is provided. The storage device includes a first storage device including a data writable and readable first storage unit; and a second storage device including a data writable and readable second storage unit.

The first storage device is controlled not to be slower than the second storage device.

The first storage device further includes a first storage area for storing management information for access control and management of the second storage unit, and the second storage device further includes a second storage area for storing management information for access control and management of the second storage unit.

The storage device further includes: an access control unit which retrieves the management information relating to the second storage unit and used for access to the second storage unit from the first storage area of the first storage device, and retrieves the management information relating to the second storage unit from the second storage area of the second storage device when the management information is not stored in the first storage area; and a capacity control unit which variably sets an allocation between a capacity of the first storage unit and a capacity of the first storage area in the first storage device.

A method of controlling a storage according to another aspect of the present invention is provided. The storage includes a first storage device including a data writable and readable first storage unit; and a second storage device including a data writable and readable second storage unit.

For controlling the storage to cause the first storage device not to be slower than the second storage device, the first storage device further includes a first storage area that stores management information for access control and management of the second storage unit, and the second storage device further includes a second storage area that stores management information for access control and management of the second storage unit.

The method includes:

performing control to retrieve the management information relating to the second storage unit and used for access to the second storage unit from the first storage area of the first storage device, and retrieve the management information relating to the second storage unit from the second storage area of the second storage device when the management information is not stored in the first storage area; and variably setting an allocation between a capacity of the first storage unit and a capacity of the first storage area in the first storage device.

A program according to another aspect of the present invention is provided. A computer implements a storage including at least:

a first storage device including a data writable and readable first storage unit; and a second storage device including a data writable and readable second storage unit, the first storage device being not slower than the second storage device, the first storage device further including a first storage area for storing management information for access control and management of the second storage unit, and the second storage device further including a second storage area for storing management information for access control and management of the second storage unit.

The program causes the computer to execute:

an access control process of retrieving the management information relating to the second storage unit and used for access to the second storage unit from the first storage area of the first storage device, and retrieving the management information relating to the second storage unit from the second storage area of the second storage device when the management information is not stored in the first storage area; and a capacity control process of variably setting an allocation between a capacity of the first storage unit and a capacity of the first storage area in the first storage device. The present invention provides a transitory computer readable memory medium (transitory machine readable medium) recording the program, such as a semiconductor memory device or a magnetic/optical recording disk (recording device).

Advantageous Effects of Invention

The present invention makes it possible to solve the above-mentioned problem and improve the access performance of a storage.

BRIEF DESCRIPTION OF DRAWINGS

FIG. 4 illustrates in (A) and (B), tables representing an exemplary high-order cache lower limit capacity distribution and an exemplary D-Partition lower limit capacity distribution, respectively, in the exemplary embodiment of the present invention.

FIG. 8 is a table illustrating an exemplary cache hit type-specific access time shortening effect in an exemplary Example of the present invention.

FIG. 9 illustrates in (A) and (B), tables representing an exemplary high-order cache lower limit capacity distribution (frequency of hits) and an exemplary D-Partition lower limit capacity distribution (frequency of hits), respectively, in the exemplary Example of the present invention.

FIG. 10 is a table illustrating an exemplary high-order cache capacity and frequency, an exemplary D-Partition capacity and frequency, and an exemplary access time shortening effect in the exemplary Example of the present invention.

FIG. 11 is a table illustrating exemplary directory information of the high-order cache in the exemplary embodiment.

FIG. 12 is a table illustrating exemplary directory information of the low-order cache in the exemplary embodiment.

DESCRIPTION OF EMBODIMENTS

Some exemplary embodiments of the present invention will be described below. As described earlier, in, for example, the hierarchical cache architecture), a low-order cache slower than any high-order cache has a capacity larger than that of the high-order cache. In the low-order cache, a storage medium which stores the main body of data to be cached may be independent of a storage medium which stores directory information (in this respect, the low-order cache is different from the high-order cache). In this case, in the low-order cache, if the storage medium that stores the main body of data has a large capacity, the volume of the directory information of the low-order cache exceeds a capacity available in the high-order cache, causing a shortage in capacity of the high-order cache. In other words, in the storage having the hierarchical cache architecture, when all the directory information of the low-order cache is stored in a high-speed storage medium such as a DRAM, the problem mentioned above in reference to the prototype example of "Technical Problem" is posed.

In some exemplary embodiments, frequently accessed directory information as part of the directory information of the low-order cache, for example, may be stored in a high-speed storage medium such as a DRAM. Alternatively, a storage area capable of storing all the directory information of the low-order cache may be provided on a storage medium different from the high-speed storage medium. More specifically, a storage area like a volume is physically or virtually defined so that the volume is used as a storage area dedicated to storing the directory information of the low-order cache. In this description, the volume defined as above is referred to as a "D-Vol" (Directory Volume).

Figure 2:
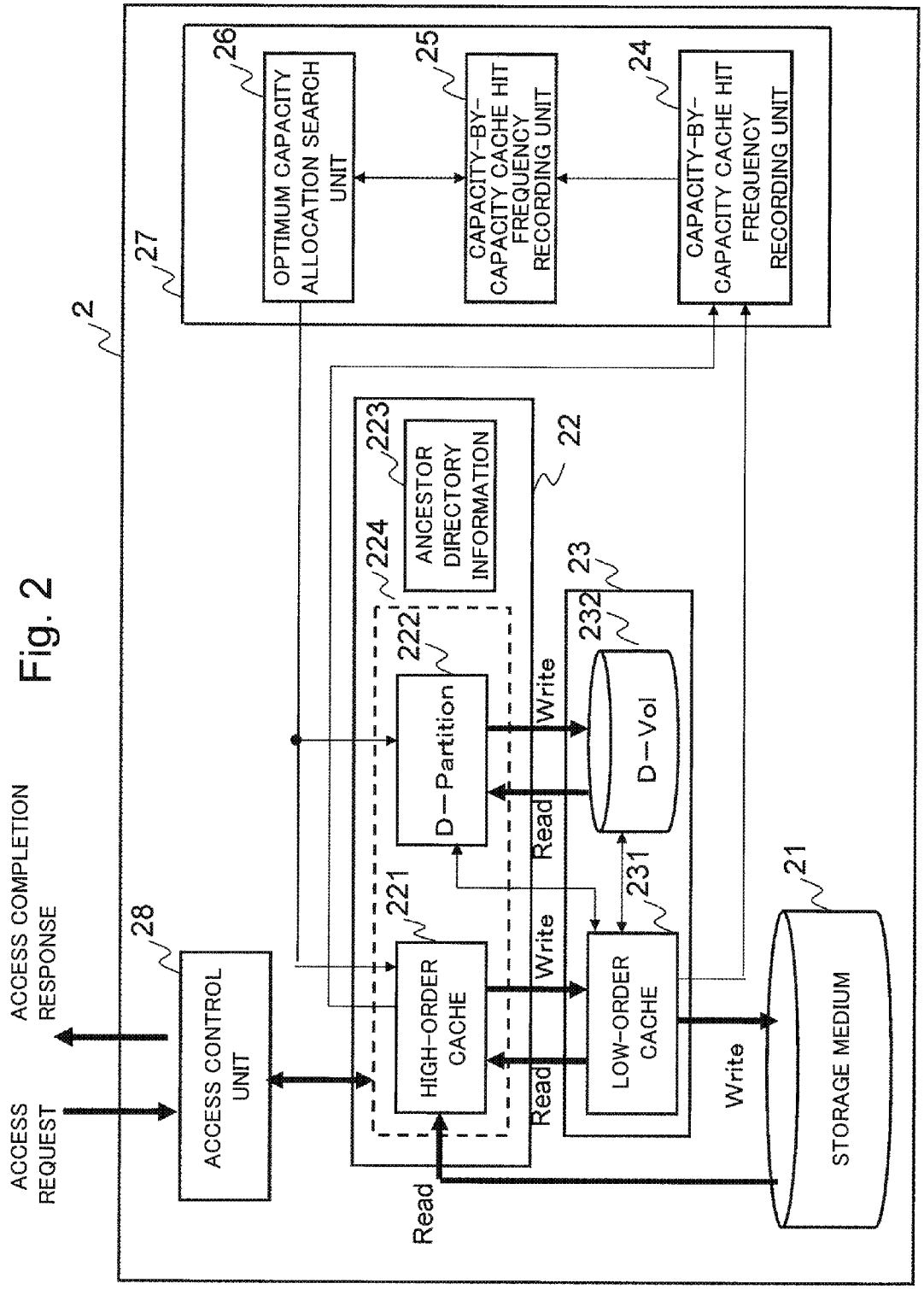
FIG. 2 is a block diagram illustrating an exemplary configuration of a storage according to the exemplary embodiment of the present invention.

According to some exemplary embodiments of the present invention, the D-Vol (for example, 232 in FIG. 2) has a capacity large enough to store all the directory information (subordinate directory information; see, for example, FIG. 12) of the low-order cache (231 in FIG. 2).

According to some exemplary embodiments of the present invention, relatively frequently accessed directory information as part of the directory information of the low-order cache (231 in FIG. 2) stored in the D-Vol (for example, 232 in FIG. 2) is stored in a high-speed storage medium (22) such as a DRAM by a high priority.

In this way, storing relatively frequently accessed directory information in the high-speed storage medium (22) by a high priority increases the probability that access to the low-order cache will result in a hit of relatively frequently accessed subordinate directory information in the high-speed storage medium (22). When the corresponding subordinate directory information is hit in the high-speed storage medium (22), access to the D-Vol (for example, 232 in FIG. 2) is unnecessary. This speeds up access to the low-order cache and improves the access performance of the entire storage system. Subordinate directory information (222) stored in the high-speed storage medium (22) functions as a cache for the D-Vol (232).

In some exemplary embodiments of the present invention, relatively frequently accessed subordinate directory information is stored by a high priority in, for example, a partition (a D-Partition 222 illustrated in FIG. 2) in the cache, serving as a subordinate directory information storage area provided on the high-speed storage medium (22). Competition between the caches is prevented using a partition to divide the cache (subordinate directory information storage area) that stores subordinate directory information.

According to some exemplary embodiments of the present invention, the capacity allocation of the high-speed storage medium (22) between the high-order cache (221 in FIG. 2) serving as a data cache and the subordinate directory information storage area (the D-Partition 222 illustrated in FIG. 2) may be determined to fall within the range of the total capacity of the high-speed storage medium (22).

The capacity optimum in terms of performance for each cache hierarchical level depends on the workload placed on the storage. The workload placed on the storage changes, for example, with time or depending on the type of program running on a host that accesses the storage. When a plurality of programs running on the host access the storage in parallel, the workload also changes depending on the combination of parallel running programs.

According to some exemplary embodiments of the present invention, to optimize the access performance of the hierarchical caches as a whole, the capacity allocation suitable for shortening the access time may be optimally, variably controlled based on the hit frequency information for a combination of capacity allocation shares between the high-order cache (221 in FIG. 2) and the subordinate directory information storage area (the D-Partition 222 illustrated in FIG. 2) in the high-speed storage medium (22 in FIG. 2).

Figure 19:
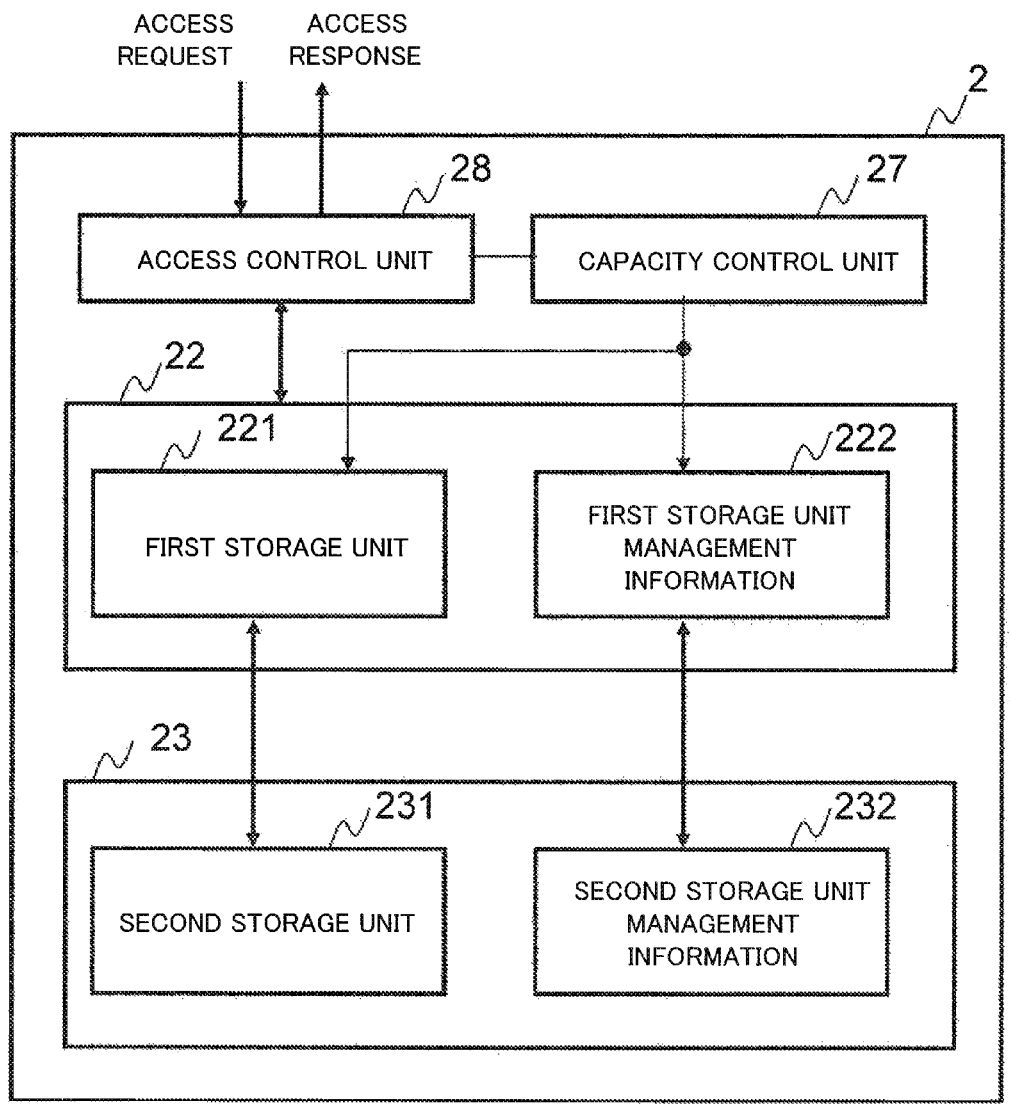
FIG. 19 is a block diagram illustrating technical features of the present invention.

Referring to FIG. 19, a storage device according to any one of some preferred exemplary embodiments of the present invention includes a first storage device (22) including a writable and readable first storage unit (221: for example, a high-order cache), and a second storage device (23) including an information data writable and readable, second storage unit (231: for example, a low-order cache). The first storage device (22) is equal in speed to or more rapid than the second storage device (23). The storage device further includes an access control unit (28) and a capacity control unit (27). When accessing to the second storage unit (231) with an access target being not stored in the first storage unit (221) for an access request, if the management information relating to the second storage unit and corresponding to the access is stored in a first storage area (222), the access control unit (28) accesses the second storage unit (231) by referring to the management information relating to the second storage unit and being stored in the first storage area (222). If the management information relating to the second storage unit is not stored in the first storage area (222), the access control unit (28) performs control to access the second storage unit (231) by referring to the management information relating to the second storage unit and being stored in the second storage area (232). The capacity control unit (27) determines the allocation between the capacity of the first storage unit (221) and the capacity of the first storage area (222) from predetermined combinations of the capacity of the first storage unit (221) and the capacity of the first storage area (222), based on analysis of access (hit frequency information) for the combinations, and sets the determined capacity allocation for the first storage unit and the first storage area (222).

Referring to FIG. 2, the capacity control unit (27) may include a determination unit (a cache hit type determination unit 24 illustrated in FIG. 2), a hit frequency recording unit (a capacity-by-capacity cache hit frequency recording unit 25 illustrated in FIG. 2), and a capacity allocation search unit (an optimum capacity allocation search unit 26 illustrated in FIG. 2). The determination unit (the cache hit type determination unit 24 illustrated in FIG. 2) calculates the allocation between the capacity of the first storage unit (221) required to hit an access target in the first storage unit (221) and the capacity of the first storage area (222) required to hit in the first storage area (222), the management information relating to the second storage unit. The hit frequency recording unit (the capacity-by-capacity cache hit frequency recording unit 25 illustrated in FIG. 2) records the frequency of occurrence of hits, every predetermined unit capacity for the first storage unit (221) and the first storage area (222). The capacity allocation search unit (the optimum capacity allocation search unit 26 illustrated in FIG. 2) determines a capacity allocation suitable for shortening the access time, based on the hit frequency information, for each combination of capacity allocation shares between the first storage unit (221) and the first storage area (222).

According to an exemplary embodiment of the present invention, a storage area (222 in FIG. 2) for storing management information for control and management of the first storage unit (221) is provided in one of the first storage device (22) and a storage device equivalent to the first storage device (22).

When no hit is obtained in the first storage unit (221) of the first storage device (22) for an access request, the access control unit (28) performs control to access the second storage unit (231) of the second storage device (23). Then, if the corresponding management information relating to the second storage unit is stored in the first storage area (222) of the first storage device (22), the access control unit (28) accesses the second storage unit (231) of the second storage device by referring to the corresponding management information relating to the second storage unit and stored in the first storage area (222) of the first storage device. When no hit is obtained in the first storage unit (221), and in access to the second storage unit (231), if the corresponding management information (subordinate directory information) relating to the second storage unit is not stored in the first storage area (222), the access control unit (28) may perform control to access the second storage unit (231) by referring to the management information relating to the second storage unit and stored in the second storage area (232) of the second storage device (23) or a storage medium (21).

In an exemplary embodiment of the present invention, the first storage unit (221) includes a first cache (high-order cache) in the first storage device (22). The second storage unit (231) includes a second cache (low-order cache) in the second storage device (23). The management information relating to the second storage unit includes the directory information of the second cache. The first storage area (222)

is provided as a partition (D-Partition)) (222) which stores some of the directory information of the second cache.

In an exemplary embodiment of the present invention, although not particularly limited, the caches have a hierarchical architecture involving two levels: high- and low-order caches. In a storage (2) including a first storage device (22) which includes a high-order cache (221) and stores some or all of the directory information of each of the high-order cache (221) and the low-order cache (231), to maximize the improvement in performance, the capacity control unit (27) dynamically calculates an optimum capacity allocation between the high-order cache (221) and a first storage area (D-Partition) (222) for storing the directory information of the low-order cache in the first storage device (22).

In the first storage unit (high-order cache) (221), the capacity control unit (27) measures the access count and the hit count and monitors the information (the priority level of replacement of ancestor directory information 223 illustrated in FIG. 11) of the order of priority of replacement (the order of priority of throwing out pages) associated with pages hit upon each access. For example, a change in hit count for the first storage unit (high-order cache) upon a decrease in capacity of the first storage unit (high-order cache) may be estimated using the priority levels of replacement of pages.

In the second storage unit (low-order cache) (231), as in the first storage unit (high-order cache) (221), the capacity control unit (27) measures the access count and the hit count and monitors the information (the priority level of replacement of subordinate directory information 2321 illustrated in FIG. 12) of the order of priority of replacement associated with pages hit upon each access. A change in hit count for the first storage unit (high-order cache) (221) upon an increase in capacity of the first storage unit (high-order cache) may be estimated using the priority level information of replacement of pages.

The capacity control unit (27) estimates a change in hit count for access to the directory information of the second storage unit (low-order cache) (231) upon a change in capacity allocation in the first storage area (D-Partition) (222).

A capacity allocation which maximizes the effect of improving the access performance is calculated for the first storage unit (high-order cache) (221) and the first storage area (D-Partition) (222), from the estimated change in hit count that depends on a change in capacity of the first storage unit (high-order cache) (221) and from the estimated change in hit count of the management information (subordinate directory information) relating to the second storage unit (low-order cache) (231), which depends on a change in capacity of the first storage area (D-Partition) (222).

More specifically, distinctions are made for each access to the storage among:

the case where the access results in a hit for the first storage unit (high-order cache);

the case where the access results in a hit for the second storage unit (low-order cache) and the management information (directory information) of the hit page is hit in the first storage area (D-Partition); and other cases (the locations of these cache hits and hits/misses of directory information will be referred to as the "types of cache hits" hereinafter).

The time by which the access time is shortened per access is estimated for each "type of cache hit."

If the capacities allocated to the first storage unit (high-order cache) (221) and the first storage area (D-Partition) (222) have changed, it is determined whether each access results in a hit, classification is done using the minimum capacity required for each access to result in a hit, and the access count is measured.

The hit determination and classification are performed for a predetermined number of accesses, and the time by which the access time is shortened by a cache hit is calculated for the predetermined number of accesses for each combination of the capacities allocated between the first storage unit (high-order cache) (221) and the first storage area (D-Partition) (222), and a capacity allocation which maximizes the time by which the access time is shortened is determined based on the calculation result.

According to an exemplary embodiment of the present invention, the storage includes:

a storage medium (21) which stores all data stored in a storage area of the storage;

a first storage unit (high-order cache) (221) and a second storage unit (low-order cache) (231) which cache the data on the storage medium (21);

a first high-speed storage (first storage device 22) and a secondary high-speed storage (second storage device 23) serving as storage media used to store the pieces of information of the first storage unit (high-order cache) (221) and the second storage unit (low-order cache) (231) (231), respectively;

a second storage area (D-Vol) (232) serving as a storage area for storing the management information (directory information) relating to the second storage unit (low-order cache) (231); and a first storage area (D-Partition) (222) which is defined for the second storage area (D-Vol) (232) in the first storage unit (high-order cache) (221) and serves as a partition of caches for the management information (directory information) relating to the second storage unit (low-order cache).

The determination unit (the cache hit type determination unit 24 illustrated in FIG. 2) determines the type of cache hit for each capacity allocation upon each access.

The frequency recording unit (the capacity-by-capacity cache hit frequency recording unit 25 illustrated in FIG. 2) records the frequency of occurrence of each type of cache hit in each of the high-order cache (221), the low-order cache (231), and the D-Partition (222) on a capacity-by-capacity basis.

The optimum capacity allocation search unit (26) retrieves a capacity allocation of the first high-speed storage which maximizes the effect of shortening the access time by a cache hit.

In PTL 1, an SSD implemented using, for example, an HDD or a NAND flash memory is used as a storage medium which stores all data of the storage. The storage medium is implemented in one or more storage media.

The first storage unit (high-order cache) and the second storage unit (low-order cache) store a copy or update of frequently accessed data of the data stored in the storage medium (21). The first storage unit (high-order cache) stores a copy or update of data accessed more frequently than the data stored in the second storage unit (low-order cache).

The first storage device (22) serves as a storage medium which actually stores data and directory information to be stored in the first storage unit (high-order cache). The first storage device (22) stores the first storage area (D-Partition) serving as a cache for the management information (directory information) relating to the second storage unit (low-order cache). The second storage device (23) serves as a storage medium which actually stores data to be stored in the second storage unit (low-order cache). Both the first storage device (22) and the secondary high-speed storage (23) allow access more rapid than the storage medium (21), and the first storage device (22) allows access more rapid than the second storage device (23).

The second storage area (D-Vol) stores the management information (directory information) relating to the second storage unit (low-order cache). The management information (directory information) relating to the second storage unit (low-order cache) and stored in the second storage area (D-Vol) is independently present without being allocated to the storage area of the entire storage so as not to be referred to from the outside of the storage.

The first storage area (D-Partition) is defined on the first storage device (22) and temporarily retains a copy or update details of some of the management information (directory information) relating to the second storage unit (low-order cache) and stored in the second storage area (D-Vol). The first storage area (D-Partition) functions as a cache dedicated to, for example, the second storage area (D-Vol), and the management information (directory information) relating to the second storage unit (low-order cache) is not stored in a cache area other than the first storage area (D-Partition).

In an exemplary embodiment of the present invention, the capacity control unit (27) of the storage uses the determination unit (cache hit type determination unit 24) which determines the type of cache hit for each capacity allocation upon each access, to determine the type of cache hit for each capacity allocation if the capacity allocation between the first storage unit (high-order cache) and the first storage area (D-Partition) is changed. Based on the determination result of the type of cache hit, the minimum capacity of the first storage unit (high-order cache) required for the access to result in a hit in the first storage unit (high-order cache), and the minimum capacity of the first storage area (D-Partition) required to hit the directory information in the first storage area (D-Partition) when the access results in a hit in the second storage unit (low-order cache), are calculated.

The hit frequency recording unit (capacity-by-capacity cache hit frequency recording unit 25) records the frequency of occurrence of each type of cache hit in each of the first storage unit (high-order cache) (221), the second storage unit (low-order cache) (231), and the first storage area (D-Partition) (222) on a capacity-by-capacity basis. The frequency of occurrence of each type of hit is recorded for each combination of capacity allocation shares, based on the minimum capacity required to get a hit in the first storage unit (high-order cache) (221) and the minimum capacity required to hit the management information relating to the second storage unit (low-order cache) (231) in the first storage area (D-Partition) (222), which are calculated by the determination unit (cache hit type determination unit 24).

The capacity allocation search unit (the optimum capacity allocation search unit 26 illustrated in FIG. 2) retrieves a capacity allocation between the first storage unit (high-order cache) (221) and the first storage area (D-Partition) (222), which maximizes the effect of shortening the access time by a cache hit. For example, a combination which maximizes the time by which the access time is shortened by a cache hit is retrieved by referring to the information (the frequencies of occurrence of each type of hit summed up for each combination of capacity allocation shares) recorded by the capacity-by-capacity cache hit frequency recording unit (25).

Unlike, for example, a Comparative Example (prototype example) to which the present invention is not applied, a capacity allocation of the first high-speed storage (first storage device), such as a DRAM, optimum in terms of maximizing the cache effect can be automatically determined for the first storage unit (high-order cache) and the first storage area (a D-Partition which caches some of the management information (subordinate directory information) relating to the second storage unit (low-order cache)). Therefore, for, for example, an access pattern that changes with time, the capacity allocation of the first high-speed storage (first storage device) between the first storage unit (high-order cache) (221) and the first storage area (D-Partition) (222) can be dynamically determined in order for optimization in terms of maximizing the cache effect.

Figure 1:
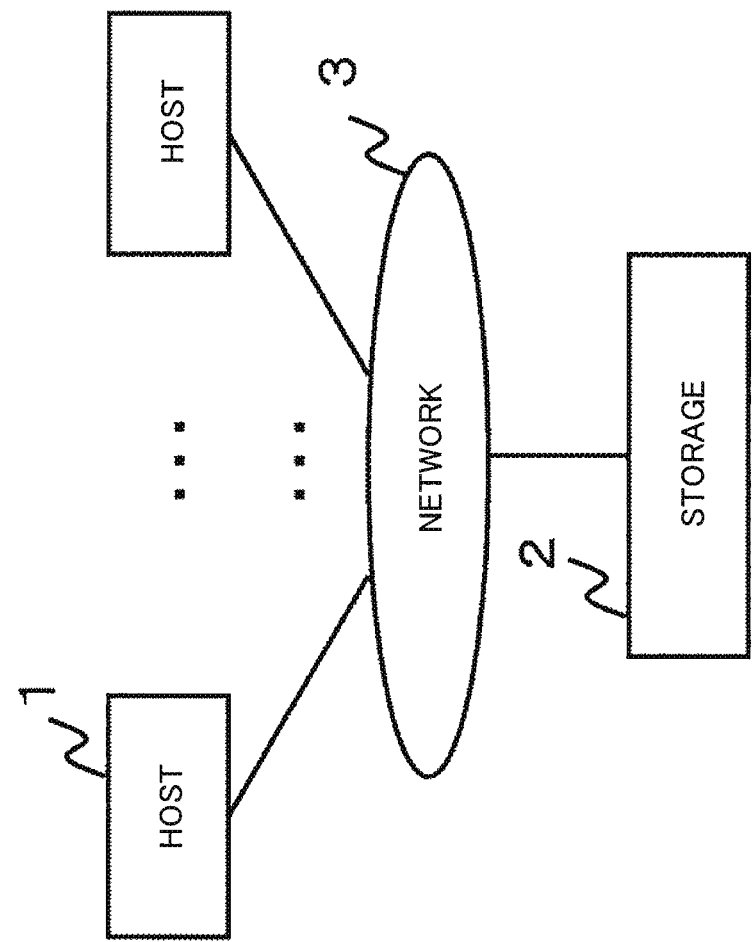
FIG. 1 is a block diagram illustrating an exemplary overall system configuration according to an exemplary embodiment of the present invention.

FIG. 1 is a block diagram illustrating an exemplary configuration according to an exemplary embodiment of the present invention. Referring to FIG. 1, an exemplary overall system configuration in the exemplary embodiment of the present invention includes one or more hosts 1 which access data, a storage 2 including one or more storage media, and a network 3 which connects the hosts 1 to the storage 2.

The present invention may employ not only a configuration which allows the network 3 to connect a plurality of hosts 1 to the storage 2 but also a configuration which directly connects the hosts 1 to the storage 2. The storage 2 may be implemented in a plurality of devices or systems connected to each other via the network 3.

The configuration of the storage 2 in the exemplary embodiment will be described below. Referring to FIG. 2, the storage 2 includes a storage medium 21, a primary high-speed storage device 22, a secondary high-speed storage device 23 an access control unit 28, and a capacity control unit 27. The capacity control unit 27 includes a cache hit type determination unit 24, a capacity-by-capacity cache hit frequency recording unit 25, and an optimum capacity allocation search unit 26.

The storage medium 21 is implemented in one or more storage media, such as SSDs, which store the data of the entire storage area of the storage 2 and are implemented using, for example, HDDs or NAND flash memories.

The primary high-speed storage device 22 (a first storage device shown in FIG. 19) serves as a medium more rapid than the storage medium 21. The primary high-speed storage device 22 is implemented in, for example, a DRAM (for example, a collection of clock-synchronized high speed DRAMs (Synchronous DRAMs)). The primary high-speed storage device 22 includes a cache area 224. The cache area 224 is partitioned into a high-order cache 221 and a D-Partition 222 which store data. The high-order cache 221 (data cache) temporarily retains a copy or update details of data stored in the storage medium 21 or a low-order cache 231. The D-Partition 222 temporarily retains a copy or update details (some of the subordinate directory information of a D-Vol) of the directory information (subordinate directory information) of the low-order cache 231. The high-order cache 221 manages data in the storage area of the storage 2 in units of pages. The primary high-speed storage device 22 stores and holds directory information (ancestor directory information) 223 of the high-order cache 221. The ancestor directory information 223 may be contained in the access control unit 28 as a table implemented using, for example, a DRAM, like the primary high-speed storage device 22. In this case, in the primary high-speed storage device 22, competition between the high-order cache 221 and D-Partition 222 partitioned in the cache area 224 can be avoided.

The ancestor directory information 223 is not particularly limited but, for example, includes, for each entry, the fields of INVALID (INVALID flag), D-Partition, page address, storage location address, UPDATED (UPDATED flag), and priority level of replacement, as shown in FIG. 11.

The INVALID flag indicates whether the directory information in question is invalid for the corresponding page, that is, whether the corresponding page of the high-order cache 221 is unused. If this directory information is invalid (unused) for the corresponding page, Yes is determined; otherwise, No is determined. The INVALID flag may take values of Yes/No, which are represented by, for example, 1/0 of 1-bit information (or 1 byte/word).

The D-Partition (flag information) indicates whether the page in question is contained in the D-Partition 222, for each page of the high-order cache 221. The D-Partition flag takes a value of Yes when the page in question is contained in the D-Partition 222 (the page in question is used to store subordinate directory information). The D-Partition flag takes a value of No when the page in question is not contained in the D-Partition 222 (the page in question is not used to store subordinate directory information but used to store data).

The page address means a page address (for example, a page number in a logical address space) in the entire storage 2, corresponding to the page stored in the high-order cache 221.

The storage location address means an address indicating the storage location of the page in the high-order cache 221.

The UPDATED flag indicates whether the data of the page in question, upon being stored in the high-order cache 221, has been updated. The UPDATED flag takes a value of UPDATED (Yes) when the data, upon being stored on the page in question of the high-order cache 221, has been updated and its update details are not reflected on the storage medium 21 (for example, not written back). The UPDATED flag takes a value of NON-UPDATED (No) when the data, upon being stored on the page in question of the high-order cache 221, remains to be updated or its update details are reflected on the storage medium 21.

The priority level of replacement is information representing the priority level of replacement of the page in question (as for value setting, the priority level of replacement is set to larger positive values for replacement by higher priorities or smaller positive values for replacement by higher priorities).

In the ancestor directory information 223, of the information of each field, the storage location address indicating a storage location in the high-order cache 221 can be omitted when pieces of directory information corresponding to respective pages have the same size and are stored as sorted.

The high-order cache 221 located in the primary high-speed storage device 22 operates as a primary cache. In response to an access request from the host 1, the high-order cache 221 is accessed first.

If the access request from the host 1 is read access, and the data to be accessed is not stored in the high-order cache 221 (a miss is determined), whether the data to be accessed is stored in the low-order cache 231 is inquired.

In the low-order cache 231, if the data to be accessed is not stored (a miss is determined), the data to be accessed is read from the storage medium 21.

The data read from a location (low-order cache 231 or storage medium 21) other than the high-order cache 221 is stored in the high-order cache 221 in units of pages and the ancestor directory information 223 is updated.

Data accessed for write is also stored in the high-order cache 221 and the ancestor directory information 223 is updated.

To store a new page in the high-order cache 221, it is necessary to reserve a space area sufficient to store the corresponding data.

If no required space area can be reserved in the high-order cache 221, a page which already stores data is thrown out using a replacement algorithm such as LRU (Least Recently Used) to reserve a required space area.

If the page replaced from the high-order cache 221 remains to be updated, this page is stored in the low-order cache 231 and the corresponding page information of the ancestor directory information 223 is updated.

The secondary high-speed storage device 23 (a second storage device 23 shown in FIG. 19) is more rapid than the storage medium 21 but equal in speed to or slower than the primary high-speed storage device 22. When, for example, the storage medium 21 is implemented in an HDD and the first high-speed storage is implemented in a DRAM, the secondary high-speed storage device 23 uses a medium having an intermediate performance, such as an SSD implemented using a NAND flash memory.

The secondary high-speed storage device 23 stores a low-order cache 231 for caching data stored in the storage medium 21, and a D-Vol 232 that is a volume for storing the directory information of the low-order cache 231. The low-order cache 231 manages data in the storage area of the storage 2 in units of, for example, pages.

The low-order cache 231 forms a general hierarchical cache for the storage medium 21, together with the high-order cache 221. The low-order cache 231 operates as a second cache with respect to the high-order cache 221. The low-order cache 231 stores data thrown out of the high-order cache 221. The low-order cache 231 may also cache the same page as in the high-order cache 221 for the storage medium 21.

Instead of being stored in the secondary high-speed storage device 23, the D-Vol 232 may be stored in an arbitrary medium other than the primary high-speed storage device 22, like, for example, the storage medium 21. In addition, in this exemplary embodiment, the page size in the low-order cache 231 is assumed to be, but need not always be equal to that in the high-order cache 221.

The directory information of the low-order cache 231 is not particularly limited but, for example, is implemented in subordinate directory information 2321 shown in FIG. 12.

Referring to FIG. 12, the subordinate directory information 2321 includes, for each entry, the fields of INVALID (INVALID flag), page address, storage location address, UPDATED (UPDATED flag), and priority level of replacement.

The INVALID flag indicates whether directory information corresponding to each page is invalid, that is, whether the corresponding page of the low-order cache 231 is unused. If the directory information is invalid (unused) for the corresponding page, Yes is determined; otherwise, No is determined. The INVALID flag may take values of Yes/No, which are represented by, for example, 1/0 of 1-bit information (or 1 byte/word).

The page address means a page address in the entire storage 2, corresponding to the page stored in the low-order cache 231. The storage location address means an address indicating the storage location of the page in the low-order cache 231.

The UPDATED flag indicates whether the data of the page in question, upon being stored in the low-order cache 231, has been updated. The UPDATED flag takes a value of Yes when the data, upon being stored on the page in question of the low-order cache 231, has been updated and its update details are not reflected on the storage medium 21. The UPDATED flag takes a value of No when the data, upon being stored on the page in question of the low-order cache 231, remains to be updated or its update details are reflected on the storage medium 21.

The priority level of replacement is information representing the priority level of replacement of the page in question. As for value setting, the priority level of replacement is not particularly limited but, for example, is set to larger positive values for replacement by higher priorities or smaller positive values for replacement by higher priorities. Note, however, that the same method as the method of assigning priority levels of replacement for ancestor directory information is adopted.

In the subordinate directory information 2321, of the information of each field, the storage location address indicating a storage location in the low-order cache 231 can be omitted when pieces of directory information corresponding to respective pages have the same size and are stored as sorted.

The flag indicating whether the directory information of each page is invalid can be omitted using a method of, for example, changing the page address corresponding to this page to a specific value when the directory information is invalid.

The subordinate directory information is stored in the high-order cache 221 and the D-Vol 232 in FIG. 2 but may further be stored in the storage medium 21.

The access control unit 28 accesses the primary high-speed storage device 22, the secondary high-speed storage device 23, and the storage medium 21 in response to an access request from the host 1 (FIG. 1).

For each access request from the host 1 to the storage 2, the cache hit type determination unit 24 postulates a plurality of combinations of capacity allocation shares of the primary high-speed storage device 22 between the high-order cache 221 and the D-Partition 222 (predetermined combinations of (A, B) for A+B=a constant (=the memory capacity of the cache area 224) when the high-order cache has A bytes and the D-Partition 222 has B bytes), and determines the type of cache hit occurring in each postulated combination of capacity allocation shares.

The cache hit type determination unit 24 determines the type of cache hit using the directory information of the high-order cache 221 and the directory information of the D-Partition 222 or D-Vol 232 referred to upon access to the low-order cache 231.

Based on the determination result of the type of cache hit for each combination of capacity allocation shares, the cache hit type determination unit 24 calculates the minimum capacity allocation between the high-order cache 221 and the D-Partition 222, required to hit the accessed page in the high-order cache 221 or hit the directory information of the low-order cache 231 in the D-Partition 222.

The capacity-by-capacity cache hit frequency recording unit 25 records the frequency of occurrence of each type of cache hit for each combination of capacity allocation shares by referring to the minimum capacity allocation between the high-order cache 221 and the D-Partition 222, required to get a hit in the high-order cache 221 or hit the directory information of the low-order cache 231 in the D-Partition 222, which is calculated by the cache hit type determination unit 24 for each accessed page.

The optimum capacity allocation search unit 26 refers to the frequency of occurrence of each type of cache hit recorded by the capacity-by-capacity cache hit frequency recording unit 25, to retrieve a capacity allocation which maximizes the time by which the access time is shortened by a cache hit, from combinations of capacity allocation shares of the primary high-speed storage device 22 between the high-order cache 221 and the D-Partition 222 every time the host 1 accesses the storage 2 a predetermined number of times. The optimum capacity allocation search unit 26 initializes the information of the frequency of occurrence of each type of cache hit recorded by the capacity-by-capacity cache hit frequency recording unit 25 upon completion of the retrieval of a capacity allocation which maximizes the time by which the access time is shortened.

The time by which the access time is shortened per access is obtained based on the difference between the time taken to make an access completion response after an access request from the host 1 to the storage 2 when a hit is obtained in the high-order cache 221, the time taken to make an access completion response after an access request when a miss is encountered in the high-order cache 221 while a hit is obtained in the low-order cache 231 and then the subordinate directory information is hit in the D-Partition 222, or the time taken to make a response after an access request when a miss is encountered in the high-order cache 221 while a hit is obtained in the low-order cache 231 and then the subordinate directory information is missed in the D-Partition 222 so that the information is referred to from the D-Vol 232, and the time taken to make an access completion response after an access request when misses are encountered in the high-order cache 221 and the low-order cache 231 so that the storage medium 21 is referred to.

The optimum capacity allocation search unit 26 calculates the time by which the access time is shortened for a predetermined number of accesses based on the above-mentioned difference and the frequency of occurrence of each type of cache hit.

Figure 3:
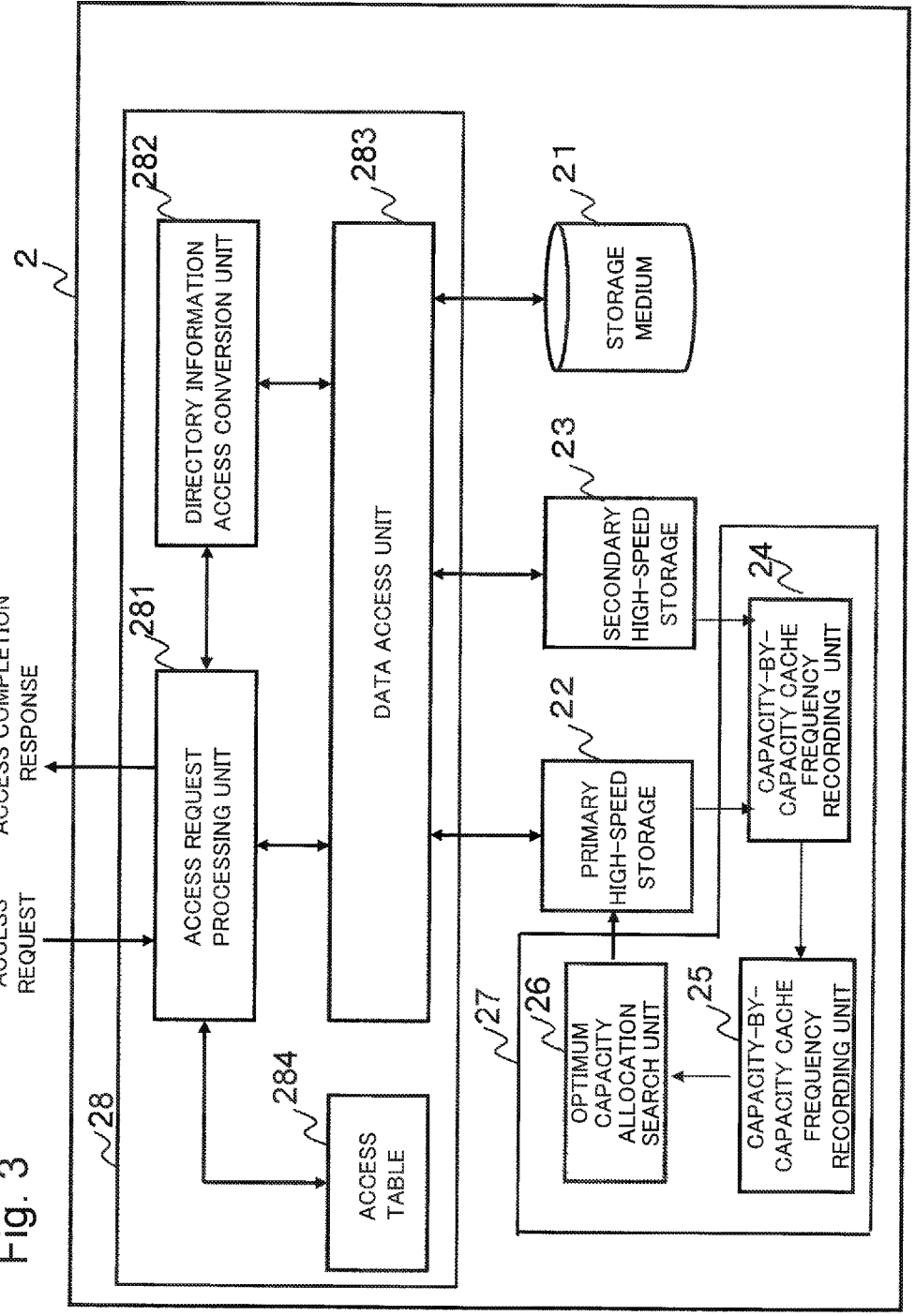
FIG. 3 is a block diagram illustrating an exemplary configuration of an access control unit in the storage according to the exemplary embodiment of the present invention.

FIG. 3 is a block diagram illustrating an exemplary configuration of the access control unit 28 shown in FIG. 2. Referring to FIG. 8, the access control unit 28 includes an access request processing unit 281, a directory information access conversion unit 282, a data access unit 283, and an access table 284.

The access request processing unit 281 interprets an access request received by the storage 2 from the host 1 (FIG. 1) and executes a process according to the access request. The access request processing unit 281 sends the access processing result back to the host 1 serving as a source of access requests.

The access request processing unit 281 interprets the access request (decodes the command and determines whether, for example, the access request is read access or write access), and performs control according to the access request (whether read or write is requested).

In execution control of an access process, the access request processing unit 281 accesses the high-order cache 221 on the primary high-speed storage device 22, the low-order cache 231 on the secondary high-speed storage device 23, and the storage medium 21 in this order via the data access unit 283. In executing read access in response to, for example, a data read request, the following access control is executed.

(a) When a hit is obtained in the high-order cache 221 on the primary high-speed storage device 22 (a page containing the data to be accessed is stored in the high-order cache 221), the low-order cache 231 on the secondary high-speed storage device 23 and the storage medium 21 are not accessed.

(b) When a miss is encountered in the high-order cache 221 on the primary high-speed storage device 22 (a page containing the data to be accessed is not stored in the high-order cache 221) while a hit is obtained in the low-order cache 231 on the secondary high-speed storage device 23 (a page containing the data to be accessed is stored in the low-order cache 231), the storage medium 21 is not accessed.

(c) When a miss is encountered in the high-order cache 221 on the primary high-speed storage device 22 and a miss is encountered in the low-order cache 231 on the secondary high-speed storage device 23 (a page containing the data to be accessed is stored in neither the high-order cache 221 nor the low-order cache 231), the storage medium 21 is accessed.

When a miss is encountered in the high-order cache 221 on the primary high-speed storage device 22 while a hit is obtained in the low-order cache 231 on the secondary high-speed storage device 23 (the above-mentioned case (b)), the page of the high-order cache 221 on the primary high-speed storage device 22 is replaced with the page hit in the low-order cache 231 as a new page. The page of the high-order cache 221 is replaced by, for example, selecting, as an empty page, a least recently used page for the time until the replacement in the high-order cache 221 occurs, storing the data of the page hit in the low-order cache 231, and registering this data in the high-order cache 221 as a new page.

When a miss is encountered in the high-order cache 221 on the primary high-speed storage device 22 and a miss is encountered in the low-order cache 231 on the secondary high-speed storage device 23 (the above-mentioned case (c)), the page of the high-order cache 221 on the primary high-speed storage device 22 may be replaced with a page containing the data of the storage medium 21 as a new page.

The access request processing unit 281 determines a hit/miss in the low-order cache 231 on the secondary high-speed storage device 23, based on the directory information of the D-Partition 222 in the high-order cache 221 or the D-Vol 232 of the secondary high-speed storage device 23. The access request processing unit 281 accesses the directory information of the D-Partition 222 in the high-order cache 221 and the D-Vol 232 of the secondary high-speed storage device 23 via the data access unit 283.

The access request processing unit 281 transmits, as a response to read access, the data read from the high-order cache 221, the low-order cache 231, or the storage medium 21 to the host 1 (FIG. 1) serving as a source of access requests.

In write access performed in response to a write request (update request) from the host 1 (FIG. 1), the access request processing unit 281 stores write data in an empty page reserved in the high-order cache 221 (FIG. 2) of the primary high-speed storage device 22 via the data access unit 283.

In reserving an empty page in the high-order cache 221, the data access unit 283 may, for example, throw a required number of pages among least recently used pages out of the high-order cache 221 and set them as empty pages. Although an update is performed in reserving an empty page to store write data, the update details on a page whose update details are not reflected on the storage medium 21 or the secondary high-speed storage device 23 may be reflected on the storage medium 21 or the secondary high-speed storage device 23 and reserved as an empty page for storing write data.

The access request processing unit 281 notifies the host 1 serving as a source of access requests, of completion of write in response to write access. The data of a page whose data is written in the high-order cache 221 on the primary high-speed storage device 22 is written back onto the storage medium 21.

The directory information access conversion unit 282 converts the access to directory information required for the access request processing unit 281 to access the low-order cache 231 (FIG. 3) into an access request to the D-Partition 222.

The access request to the directory information of the low-order cache from the access request processing unit 281, converted by the directory information access conversion unit 282, is transferred to the data access unit 283 to access the D-Partition 222 via the data access unit 283.

The data access unit 283 determines whether the directory information of the low-order cache 231 to be accessed is cached in the D-Partition 222 (the D-Partition 222 serves as a partition located in the cache area 224 to cache the directory information of the low-order cache 231 stored in the D-Vol 232).

When the corresponding directory information (subordinate directory information) of the low-order cache 231 is stored in the D-Partition 222, the data access unit 283 accesses the directory information stored in the D-Partition 222 as the directory information of the low-order cache 231 and transfers this directory information to the access request processing unit 281.

On the other hand, when a miss is encountered in the D-Partition 222, the data access unit 283 accesses the directory information (subordinate directory information) stored in the D-Vol 232 of the secondary high-speed storage device 23.

The data access unit 283 reads, writes, copies, and moves data/information and reflects their update details, in units of pages among the storage medium 21, the high-order cache 221 of the primary high-speed storage device 22, and the low-order cache 231 of the secondary high-speed storage device 23 in response to instructions from the access request processing unit 281 and the directory information access conversion unit 282.

Referring to FIGS. 2 and 3, the storage medium 21, the primary high-speed storage device 22, and the secondary high-speed storage device 23 are connected to each other via the data access unit 283. The data access unit 283 includes, for example, buses and bus interfaces (bus adapters) among the storage medium 21, the primary high-speed storage device 22, and the secondary high-speed storage device 23 as hardware resources (not illustrated).

The access table 284 stores the page address of the access destination to any of the storage medium 21, the high-order cache 221 (FIG. 3) of the primary high-speed storage device 22, and the low-order cache 231 and D-Vol 232 (FIG. 2) of the secondary high-speed storage device 23 to process an access request received by the access request processing unit 281 from the host 1.

The page address stored in the access table 284 is referred to by the access request processing unit 281.

In the access request processing unit 281, when the data of the page to be accessed is stored in the low-order cache 231 (FIG. 2), the access table 284 is used for, for example, mutual exclusion in which this data is locked and thereby prevented from being replaced with the data of another page during an access process.

The page address stored in the access table 284 is deleted (unlocked) by the access request processing unit 281 upon completion of the access process involved.

FIG. 4 illustrates in (A) and (B), exemplary information of the frequencies of occurrence of each type of cache hit recorded for each combination of capacity allocation shares between the high-order cache 221 and the D-Partition 222 by the capacity-by-capacity cache hit frequency recording unit 25 according to this exemplary embodiment (FIGS. 2 and 3). Since the primary high-speed storage device 22 stores only the high-order cache 221 and the D-Partition 222, a combination of capacity allocation shares is uniquely determined based on the capacity of either the high-order cache 221 or the D-Partition 222. Therefore, in practice, the capacity-by-capacity cache hit frequency recording unit 25 need only measure a minimum capacity required to obtain a cache hit for each type of cache hit and the frequency of access corresponding to each obtained capacity.

The capacity-by-capacity cache hit frequency recording unit 25 generates a high-order cache lower limit capacity distribution 251 representing the distribution of the lower limit capacity of the high-order cache 221 when the minimum capacity required for each access to result in a hit in the high-order cache 221 is calculated, and a D-Partition lower limit capacity distribution 252 representing the distribution of the lower limit capacity of the D-Partition 222 when the minimum capacity of the D-Partition 222 required to hit the directory information of the low-order cache 231 is calculated.

In the high-order cache lower limit capacity distribution 251 shown in, for example, (A) of FIG. 4, the distribution of the lower limit capacity for hits obtained in the high-order cache 221 upon 30000 accesses from the host 1 to the storage 2 is represented using 256 MB (MegaBytes) as the unit of the capacity of the high-order cache 221. In the example of the high-order cache lower limit capacity distribution 251 shown in FIG. 3, when the capacity of the high-order cache 221 is increased from 256 MB to 512 MB, 4000 new accesses result in hits for the high-order cache 221.

Similarly, in the D-Partition lower limit capacity distribution 252 shown in (B) of FIG. 4, the distribution of the lower limit capacity for hits obtained in the D-Partition 222 upon 30000 accesses from the host 1 to the storage 2 is represented using 256 MB (MegaBytes) as the unit of the capacity of the D-Partition 222.

Although the distribution of the lower limit capacity is represented in units of 256 MB for each of the high-order cache lower limit capacity distribution 251 and D-Partition lower limit capacity distribution 252 illustrated in FIG. 4, the unit of the capacity may be arbitrarily determined within the range of the primary high-speed storage device 22. In addition, although the count of accesses that result in new hits for each lower limit capacity is represented as the difference in count for each capacity in FIG. 3, the absolute count of accesses that result in hits for each capacity may be used.

Figure 5:
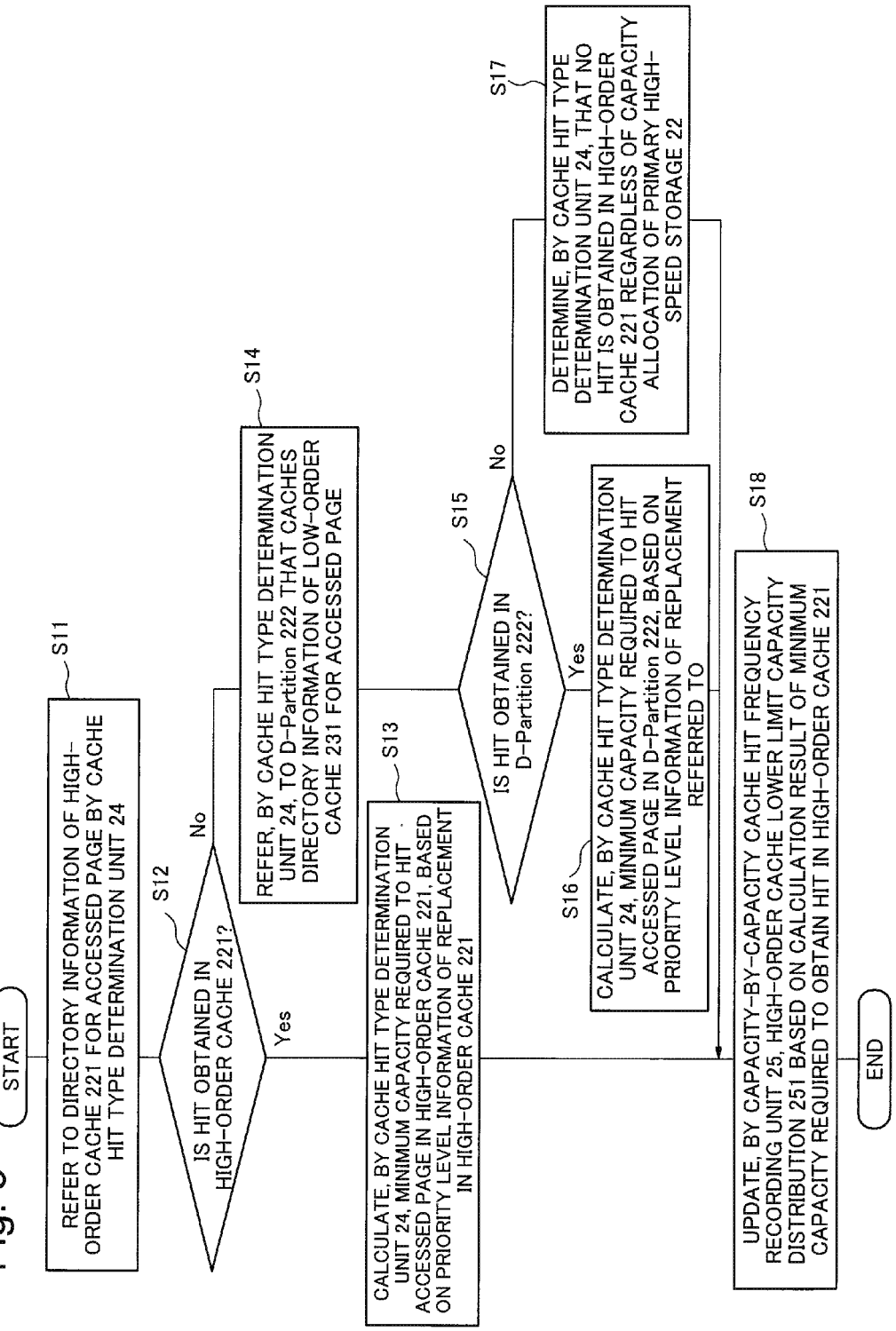
FIG. 5 is a flowchart illustrating a procedure for updating the high-order cache lower limit capacity distribution for each access process in the exemplary embodiment of the present invention.
Figure 6:
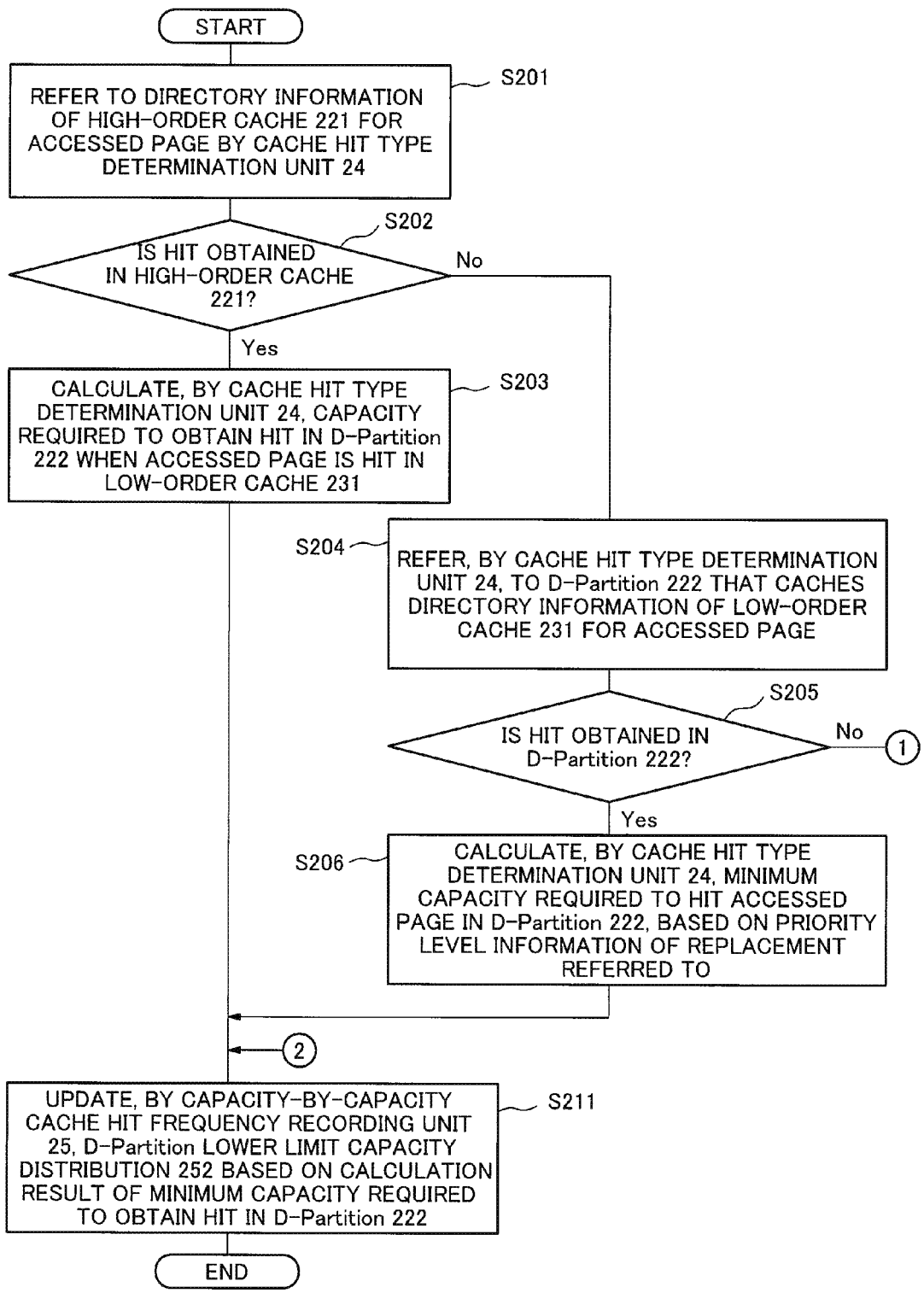
FIG. 6 is a flowchart (first exemplary flowchart) illustrating a procedure for updating the D-Partition lower limit capacity distribution for each access process in the exemplary embodiment of the present invention.
Figure 7:
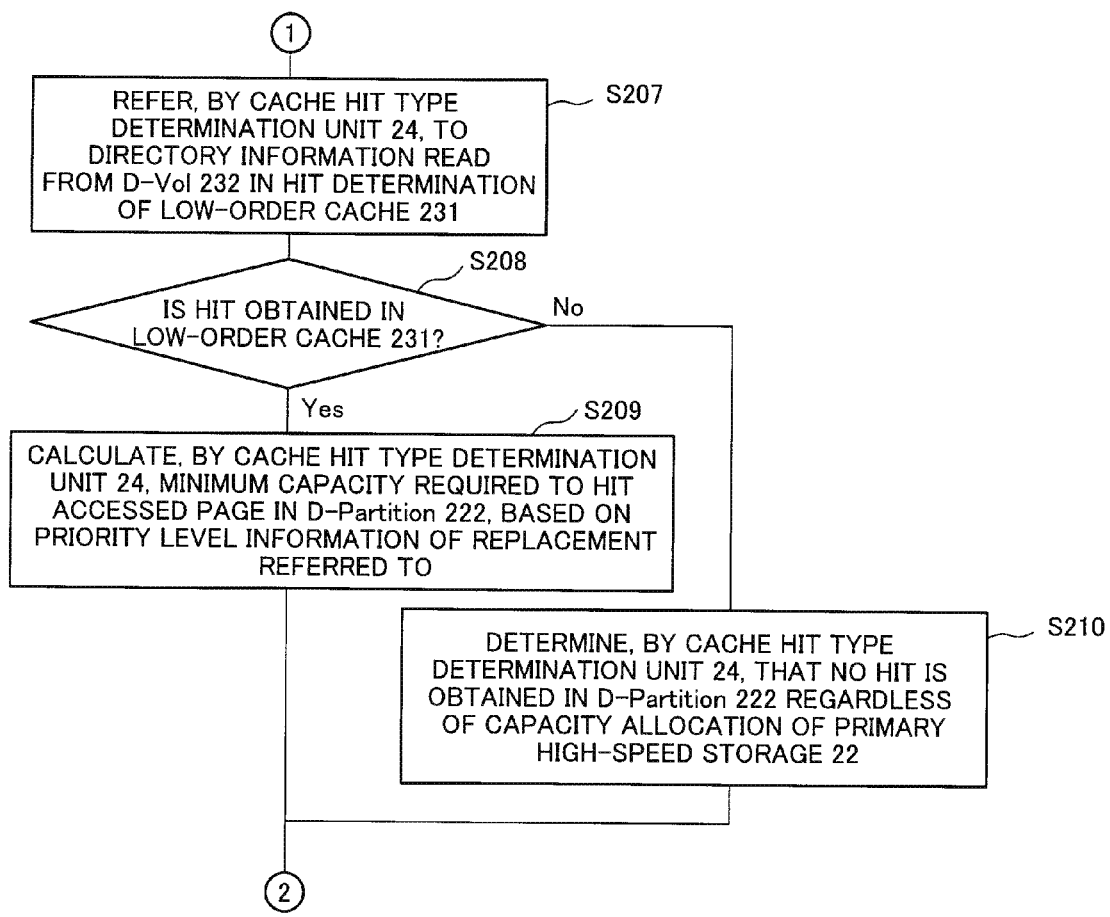
FIG. 7 is a flowchart (second exemplary flowchart) illustrating another procedure for updating the D-Partition lower limit capacity distribution for each access process in the exemplary embodiment of the invention.

Operations in the exemplary embodiment of the present invention will be described below with reference to FIGS. 1 to 4, a flowchart shown in FIG. 5, and a set of flowcharts shown in FIGS. 6 and 7. FIGS. 6 and 7 are divided merely for the sake of convenience of drawing the figures.

A procedure for calculating the minimum capacity of the high-order cache 221 required to hit the page accessed from the host 1 in the high-order cache 221, to calculate the frequency of occurrence of each type of cache hit for each combination of capacity allocation shares in this exemplary embodiment will be described first with reference to FIGS. 1 to 5.

In response to an access request from the host 1 to the storage 2, the cache hit type determination unit 24 refers to the directory information 223 of the high-order cache 221 for the accessed page (step S11).

If the accessed page is hit in the high-order cache 221 and the ancestor directory information 223 is present (Yes in step S12), the cache hit type determination unit 24 reads the priority level information of replacement in the high-order cache 221 from the ancestor directory information of the hit page. Note that hit determination is done by the access control unit 28. The cache hit type determination unit 24 receives the hit determination result obtained by the access control unit 28. The cache hit type determination unit 24 calculates the minimum capacity of the high-order cache 221 required to hit the page in the high-order cache 221, based on the priority level information of replacement of the page hit in the high-order cache 221. The cache hit type determination unit 24 then executes a process in step S18 and subsequent processes (step S13).

If the accessed page is not hit in the high-order cache 221 (No in step S12), the cache hit type determination unit 24 refers to the D-Partition 222 for the accessed page (step S14). The D-Partition 222 caches the directory information of the low-order cache 231.

If the accessed page is hit in the D-Partition 222 and subordinate directory information is present in the D-Partition 222 (Yes in step S15), the cache hit type determination unit 24 reads the priority level information of replacement in the low-order cache 231 from the subordinate directory information of the hit page. The cache hit type determination unit 24 calculates the minimum capacity of the high-order cache 221 theoretically required to hit in the high-order cache 221, the page hit in the D-Partition 222, based on the priority level information of replacement of this page. The cache hit type determination unit 24 then executes a process in step S18 and subsequent processes (step S16).

If the accessed page is not hit in the primary high-speed storage device 22 and subordinate directory information is absent (No in step S15), it is impossible to hit the accessed page in the high-order cache 221, regardless of the capacity allocation between the high-order cache 221 and D-Partition 222 of the primary high-speed storage device 22. Hence, the cache hit type determination unit 24 determines that no hit is obtained in the high-order cache 221 regardless of the capacity allocation of the primary high-speed storage device 22 (step S17).

The capacity-by-capacity cache hit frequency recording unit 25 refers to the minimum capacity required to get a hit in the high-order cache 221, obtained by the cache hit type determination unit 24, and adds up the count of corresponding capacities in the high-order cache lower limit capacity distribution 251.

If it is determined in step S17 that no hit is obtained in the high-order cache 221 regardless of the capacity allocation of the primary high-speed storage device 22, the count of constant misses in the high-order cache lower limit capacity distribution 251 is added up (step S18).

The above-mentioned processes in steps S11 to S18 are executed to complete an operation of calculating the minimum capacity of the high-order cache 221 required to hit the page accessed from the host 1 in the high-order cache 221, to calculate the frequency of occurrence of each type of cache hit for each combination of capacity allocation shares.

A procedure for calculating the minimum capacity of the D-Partition 222 required to hit the page accessed from the host 1 in the low-order cache 231 and hit the directory information of this page in the D-Partition 222, to calculate the frequency of occurrence of each type of cache hit for each combination of capacity allocation shares in the present invention will be described next with reference to FIGS. 1 to 7.

In response to an access request from the host 1 to the storage 2, the cache hit type determination unit 24 refers to the directory information of the high-order cache 221 for the accessed page (step S201 in FIG. 6).

If the accessed page is hit in the high-order cache 221 and ancestor directory information is present (Yes in step S202 in FIG. 6), the cache hit type determination unit 24 reads the priority level information of replacement in the high-order cache 221 from the directory information of the hit page.

The cache hit type determination unit 24 calculates the minimum capacity required to hit the subordinate directory information in the D-Partition 222 when the page hit in the high-order cache 221 is thrown out of the high-order cache 221 and hit in the low-order cache 231, based on the priority level information of replacement of this page. The cache hit type determination unit 24 then executes a process in step S211 and subsequent processes (step S203 in FIG. 6).

If the accessed page is not hit in the high-order cache 221 (No in step S202), the cache hit type determination unit 24 refers to the D-Partition 222 (step S204 in FIG. 6). The D-Partition 222 caches the subordinate directory information of the low-order cache 231 for the accessed page.

If the accessed page is hit in the D-Partition 222 and directory information is present (Yes in step S205 of FIG. 6), the cache hit type determination unit 24 reads the priority level information of replacement in the low-order cache 231 from the subordinate directory information of the hit page.

The cache hit type determination unit 24 calculates the minimum capacity required to hit the subordinate directory information in the D-Partition 222 when the page hit in the D-Partition 222 is hit in the low-order cache 231, based on the priority level information of replacement of this page. The cache hit type determination unit 24 then executes a process in step S211 and subsequent processes (step S206 in FIG. 6).

If the accessed page is not hit in the D-Partition 222 and directory information is absent (No in step S205 of FIG. 6), the cache hit type determination unit 24 reads the priority level information of replacement in the low-order cache 231 from directory information read from the D-Vol 232 for low-order cache hit determination and access (step S207 in FIG. 7).

If the accessed page is hit in the low-order cache 231 (Yes in step S208 of FIG. 7), the cache hit type determination unit 24 calculates the minimum capacity required to hit the directory information in the D-Partition 222 when the page read from the D-Vol 232 is hit in the low-order cache 231, based on the priority level information of replacement of the subordinate directory information of this page. The cache hit type determination unit 24 then executes a process in step S211 and subsequent processes (step S209 in FIG. 7).

If the accessed page is missed even in the low-order cache 231 (No in step S208 of FIG. 7), it is impossible to hit the directory information in the D-Partition 222 when the accessed page is hit in the low-order cache 231, regardless of the capacity allocation between the high-order cache 221 and D-Partition 222 of the primary high-speed storage device 22. Hence, the cache hit type determination unit 24 determines that no hit is obtained in the D-Partition 222 regardless of the capacity allocation of the primary high-speed storage device 22 (step S210 in FIG. 7).

The capacity-by-capacity cache hit frequency recording unit 25 refers to the minimum capacity required to hit the directory information in the D-Partition 222, obtained by the cache hit type determination unit 24, and adds up the count of corresponding capacities in the D-Partition lower limit capacity distribution 252. If it is determined in step S210 that no hit is obtained in the D-Partition 222 regardless of the capacity allocation of the primary high-speed storage device 22, the count of constant misses in the D-Partition lower limit capacity distribution 252 is added up (step S211 in FIG. 6).

The above-mentioned processes in steps S201 to S211 are executed to complete a series of operations of calculating the minimum capacity of the D-Partition 222 required to hit the page accessed from the host 1 (FIG. 1) in the low-order cache 231 and hit the subordinate directory information of this page in the D-Partition 222, to calculate the frequency of occurrence of each type of cache hit for each combination of capacity allocation shares.

An exemplary access control operation when the capacity of the D-Partition 222 is set to a predetermined value (the capacity allocation between the high-order cache 221 and the D-Partition 222 is set to a predetermined value) will be described with reference to FIGS. 13 to 18.

<Read or Write Access Request Process>

Figure 13:
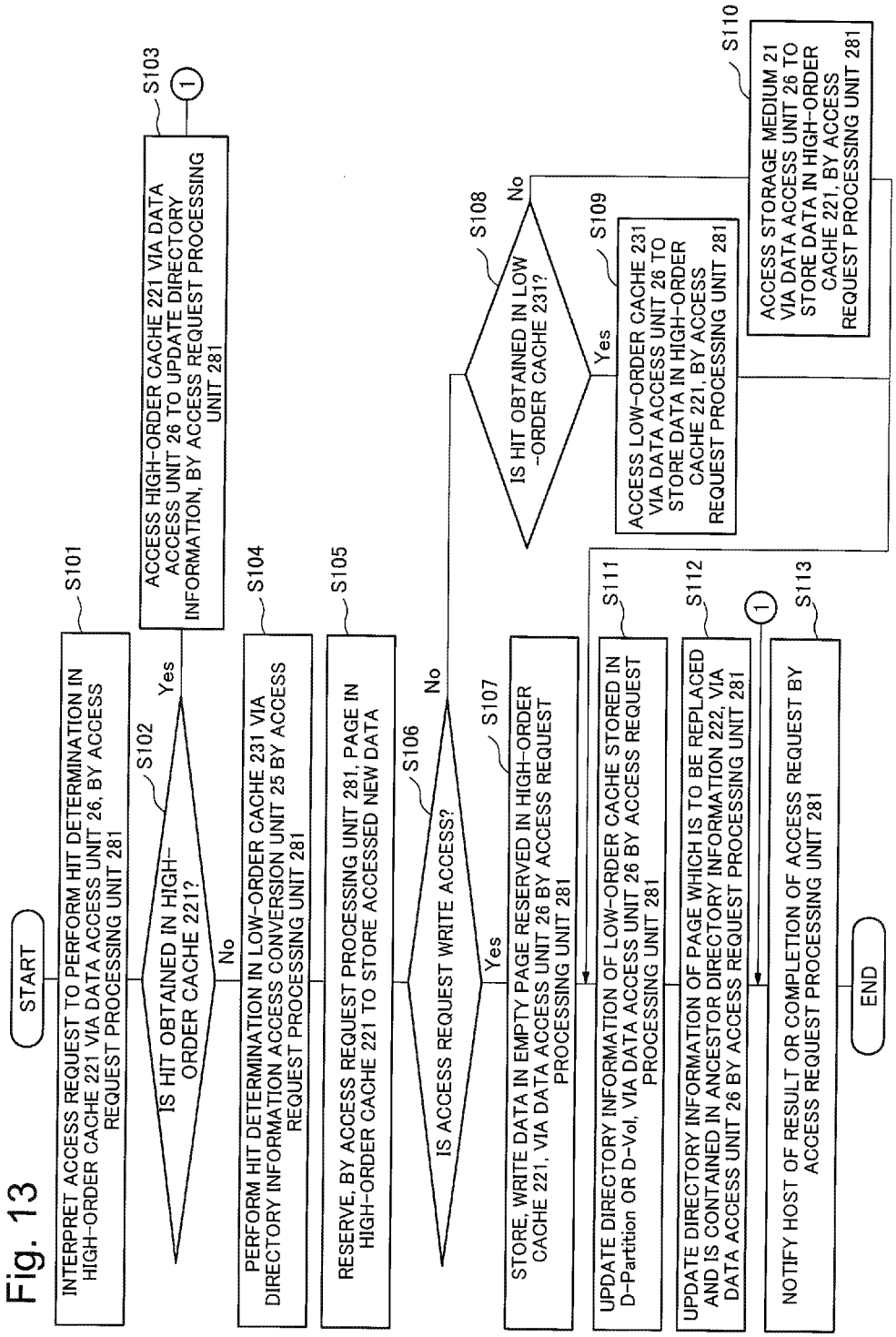
FIG. 13 is a flowchart illustrating the procedure of a read or write process in the exemplary embodiment of the present invention.

FIG. 13 is a flowchart for explaining a read or write access process. An overview of an operation for executing a read access or write access request process in the exemplary embodiment will be described below with reference to FIGS. 1, 3, and 13.

In response to an access request from the host 1 to the storage 2, in the storage 2, the access request processing unit 281 interprets the access request and registers the address of the page to be accessed in the access table 284. The access request processing unit 281 accesses the ancestor directory information 223 that is the directory information of the high-order cache 221 via the data access unit 283 to determine whether the page to be accessed is stored in the high-order cache 221 (hit determination) (step S101 in FIG. 13).

The access request processing unit 281 determines a hit/miss in accordance with whether a page address identical to the address of the page to be accessed is stored in the ancestor directory information 223. Referring, for example, to FIG. 4, a hit is determined when the page address of the ancestor directory information 223 coincides with the address of the page to be accessed and any page exhibiting an INVALID flag having a value of "No" and a D-Partition flag having a value of "No" is present.

If the page to be accessed is stored in the high-order cache 221 (a hit is determined; Yes in step S102 of FIG. 13), the access request processing unit 281 accesses the page hit in the high-order cache 221, via the data access unit 283. The access request processing unit 281 updates the directory information of the hit page, contained in the ancestor directory information 223 of the primary high-speed storage device 22 (for example, sets the UPDATED flag in updating the priority level of replacement). The access request processing unit 281 executes a process in step S113 and subsequent processes (connector 1) (step S103 in FIG. 13).

If the page to be accessed is not stored in the high-order cache 221 (a miss is determined; No in step S102 of FIG. 13), the access request processing unit 281 reads the subordinate directory information of the low-order cache 231 via the directory information access conversion unit 282 to determine whether the page to be accessed is stored in the low-order cache 231 (hit determination) (step S104 in FIG. 13). Note that the access request processing unit 281 refers to the subordinate directory information 2321 (FIG. 12) stored in the D-Partition 222, via the directory information access conversion unit 282 and the data access unit 283. If the subordinate directory information 2321 to be accessed is not stored in the D-Partition 222, the access request processing unit 281 refers to the D-Vol 232 of the secondary high-speed storage device 23 via the directory information access conversion unit 282 and the data access unit 283.

The access request processing unit 281 reserves in the high-order cache 221, an empty space for storing new data to be accessed, via the data access unit 283. The data access unit 283 replaces the page of the high-order cache 221 to reserve an empty space (step S105 in FIG. 13). In other words, in reserving an empty page in the high-order cache 221, the data access unit 283 may, for example, throw a required number of pages among least recently used pages out of the high-order cache 221 and set them as empty pages. The pages thrown out of the high-order cache 221 are stored in, for example, the low-order cache 231 and the ancestor directory information 223 and the subordinate directory information 2321 are updated.

If the access request is write access (Yes in step S106 of FIG. 13), the access request processing unit 281 reserves a page in the high-order cache 221 via the data access unit 283, writes write data on the reserved empty page (step S107 in FIG. 13), and executes a process in step S111 and subsequent processes.

If the access request is read access (No in step S106 of FIG. 13), and it is determined in step S104 that a hit is obtained in the low-order cache 231 (Yes in step S108 of FIG. 13), the access request processing unit 281 accesses the page hit in the low-order cache 231, via the data access unit 283. The access request processing unit 281 replaces an arbitrary page contained in the high-order cache 221 with the data read from the page hit in the low-order cache 231, via the data access unit 283, and executes a process in step S111 of FIG. 13 and subsequent processes (step S109 in FIG. 13).

If a miss is encountered in the low-order cache 231 (No in step S108 of FIG. 13), the access request processing unit 281 issues an access request to the storage medium 21 via the data access unit 283. The access request processing unit 281 stores the data accessed by the storage medium 21 in the high-order cache 221 in units of pages via the data access unit 283. The access request processing unit 281 throws out the data of a page (a page to be thrown out of the high-order cache 221) to be replaced by storing new data in the high-order cache 221, and moves the thrown data to the low-order cache 231. In the low-order cache 231, by the movement of the data of this page in the high-order cache 221, the page to be replaced is deleted (in order to store the data thrown out of the high-order cache 221 into the low-order cache 231, the data of the page of the low-order cache 231 is deleted to reserve an empty page). When the page to be deleted has been updated (the UPDATE flag of this page is ON), the access request processing unit 281 reflects the update details on the storage medium 21 via the data access unit 283 (step S110 in FIG. 13).

The access request processing unit 281 updates the directory information (subordinate directory information) of the low-order cache 231 stored in the D-Partition 222 or the D-Vol 232 of the secondary high-speed storage device 23, via the directory information access conversion unit 282 and the data access unit 283 (step S111 in FIG. 13). In other words, a change in state of the page in the low-order cache 231 upon the processes in, for example, steps S105 to S110 is reflected on the D-Partition 222 or the D-Vol 232 of the secondary high-speed storage device 23.

The access request processing unit 281 updates the information of the replaced page, contained in the ancestor directory information 223 of the primary high-speed storage device 22, via the data access unit 283 (step S112 in FIG. 13). A change in state of the page in the high-order cache 221 upon the processes in, for example, steps S105 to S110 is reflected on the ancestor directory information 223 of the primary high-speed storage device 22.

Although the ancestor directory information 223 is updated in step S109 after the directory information of the low-order cache 231 is updated in step S108 in FIG. 13, the update in step S109 may be simultaneous with or prior to the update in step S108.

The access request processing unit 281 sends back read data in response to the read access request, or a notification of completion of write access to the host 1 (FIG. 1) serving as a source of access requests, and ends the process (step S113 in FIG. 13). Steps S108 to S110 in FIG. 13 exemplify read access in which upon misses/hits in the high- and low-order caches 221 and 231, access data are read from the storage medium 21 and stored in the high-order cache 221.

In write access, upon misses/hits in the high-order cache 221 and the low-order cache 231, a page may be reserved in the high-order cache 221, and data may be written on the page and written back onto the storage medium 21. In this case, a notification of completion of write access to the host 1 (FIG. 1) may be sent assuming completion of data storage in the high-order cache 221 as a trigger.

The above-mentioned processes in steps S101 to S113 are executed to complete an operation of executing a read access or write access request process in the exemplary embodiment.

<Reservation of Page for Storing New Data in High-Order Cache>

Figure 14:
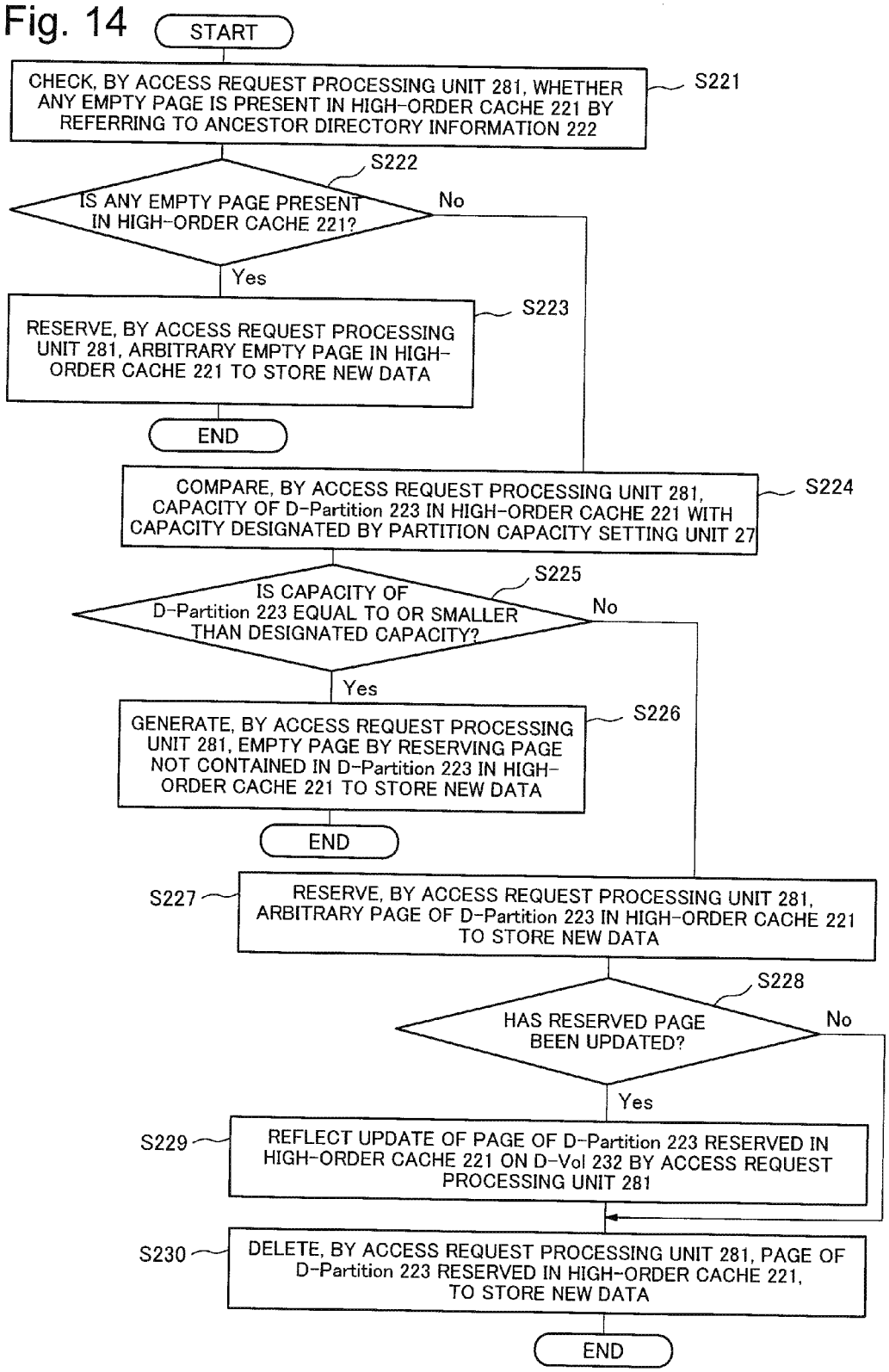
FIG. 14 is a flowchart illustrating a procedure for reserving a page for storing new data in the high-order cache according to the exemplary embodiment of the present invention.

FIG. 14 is a flowchart for explaining the process in step S105 of FIG. 13. In step S105 of FIG. 13, the access request processing unit 281 reserves in the high-order cache 221 of the primary high-speed storage device 22, an empty page for storing new data to be accessed, via the data access unit 283, as described earlier. Details of step S105 in FIG. 13 (reservation of a page for storing new data in the high-order cache) will be described below with reference to FIG. 14.

The access request processing unit 281 refers to the INVALID flag of the directory information of each page in the ancestor directory information 223 via the data access unit 283 to check whether any empty page (any unused page exhibiting an INVALID flag having "Yes" in FIG. 11) is present in the high-order cache 221 (step S221 in FIG. 14). If any empty page is present in the high-order cache 221 (Yes in step S222 of FIG. 14), the access request processing unit 281 reserves an arbitrary empty page in the high-order cache 221 as an empty page for storing new data, via the data access unit 283, and ends the process (step S223 in FIG. 14).

If any empty page is absent in the high-order cache 221 (No in step S222 of FIG. 14), the access request processing unit 281 refers to the ancestor directory information 223 via the data access unit 283 to check the capacity of the D-Partition 222 contained in the high-order cache 221. The capacity of the D-Partition 222 contained in the high-order cache 221 is calculated from the total number of pages having "Yes" in the "D-Partition" field of the ancestor directory information 223 illustrated in FIG. 11 (pages contained in the D-Partition 222).

The access request processing unit 281 compares the capacity (current capacity) of the D-Partition 222 with the capacity value (threshold) of the D-Partition 222 designated by the capacity control unit 27 (optimum capacity allocation search unit 26) (step S224 in FIG. 14). If the current capacity of the D-Partition 222 is equal to or smaller than the capacity value designated by the capacity control unit 27 (optimum capacity allocation search unit 26) (Yes in step S225 of FIG.

14), the access request processing unit 281 deletes the data of any page that is not contained in the D-Partition 222 (any page exhibiting a D-Partition flag having "No" in FIG. 11) of the pages contained in the high-order cache 221 to generate an empty page for new data to be stored, and ends the process (step S226 in FIG. 14).

If the capacity of the D-Partition 222 is larger than the capacity value designated by the capacity control unit 27 (No in step S225 of FIG. 14), the access request processing unit 281 selects an arbitrary page contained in the D-Partition 222 (any page for storing the subordinate directory information) of the pages contained in the high-order cache 221, as a page for storing new data (step S227 in FIG. 14). In selecting any page for storing new data from the pages contained in the D-Partition 222 (pages for storing subordinate directory information) and reserving the selected page as a page for storing new data, a least recently used page (a page for storing the subordinate directory information) at this point of time may be selected.

If the directory information (the UPDATED flag in FIG. 11) recorded in the ancestor directory information 223 reveals that the page reserved in step S227 of FIG. 14 remains to be updated (No in step S228 of FIG. 14), the access request processing unit 281 executes a process in step S230 of FIG. 14 and subsequent processes.

If the directory information recorded in the ancestor directory information 223 reveals that the page reserved in step S227 of FIG. 14 has been updated (Yes in step S228 of FIG. 14), the access request processing unit 281 reflects the update details of the page, reserved in step S227 of FIG. 14, on the page of the D-Vol 232 of the low-order cache 231 corresponding to the page contained in the D-Partition 222 and reserved in step S207 (step S229 in FIG. 14).

The access request processing unit 281 deletes the page reserved in step S227 (this page contained in the D-Partition 222) from the D-Partition 222 (that is, this page is set not to be contained in the D-Partition 222; the D-Partition flag (FIG. 11) of the ancestor directory information 223 is set to "No"), via the data access unit 283. The access request processing unit 281 selects the reserved page as an empty page for storing new data and updates the ancestor directory information 223 to reflect a change of the page in the high-order cache 221 upon the processes in, for example, steps S227 of FIG. 14 and other steps, via the data access unit 283, and ends the process (step S230 in FIG. 14).

The access request processing unit 281 executes the above-mentioned processes in steps S221 to S230 to complete an operation of reserving in the high-order cache 221, an empty page for storing new data to be accessed, via the data access unit 283 (step S105 in FIG. 13).

<Reservation of Empty Page for Storing New Data not Contained in D-Partition>

Figure 15:
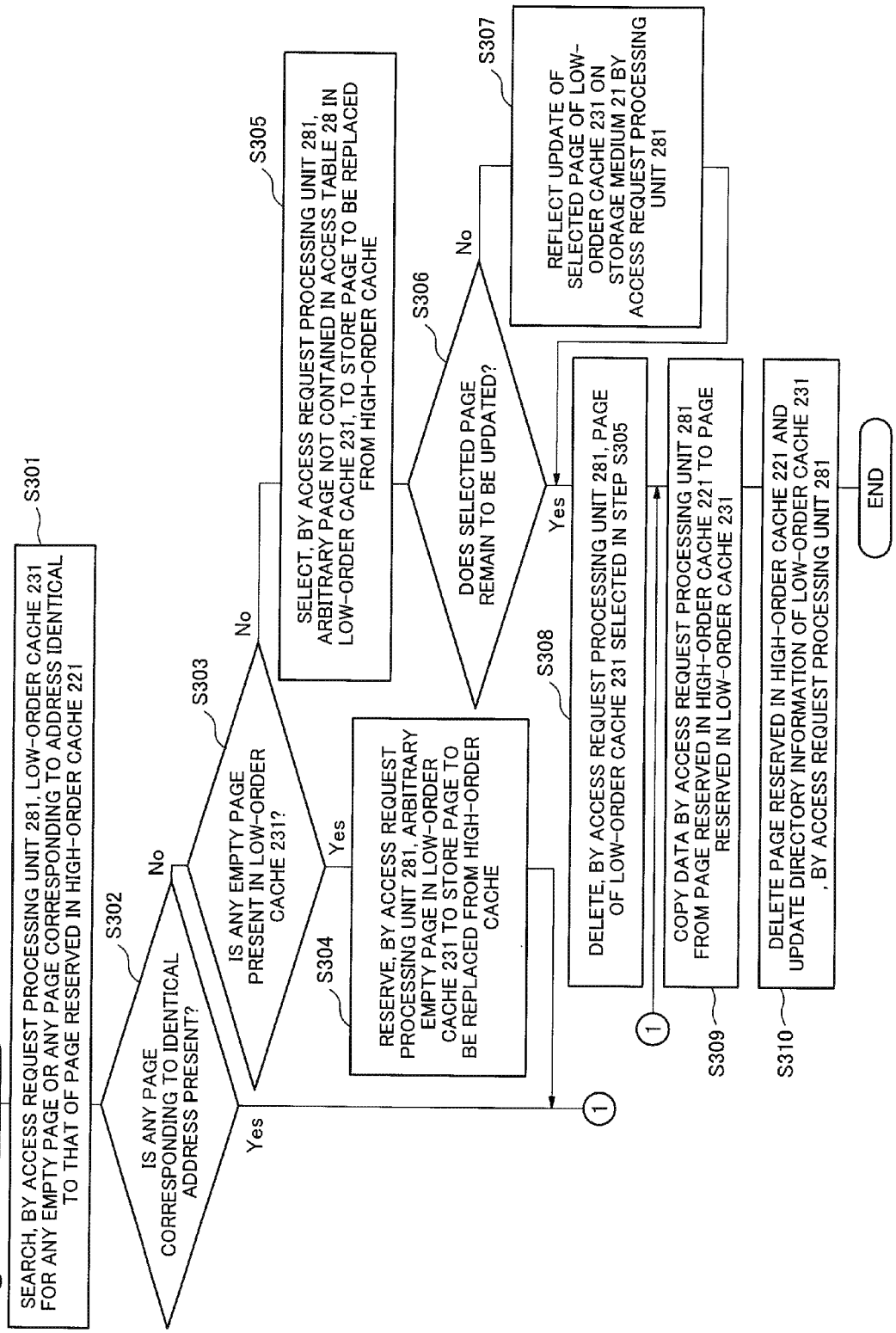
FIG. 15 is a flowchart illustrating a procedure for reserving a page for storing new data in the low-order cache according to the exemplary embodiment of the present invention.

FIG. 15 is a flowchart for explaining the process in step S226 of FIG. 14. In step S226 of FIG. 14, any page not contained in the D-Partition 222 of the pages contained in the high-order cache 221 is reserved as a page for storing new data. Reservation of an empty page for storing new data (step S226 in FIG. 14) will be described below with reference to FIG. 15.

The access request processing unit 281 accesses the D-Partition 222 or the D-Vol 232 of the secondary high-speed storage device 23 to refer to the subordinate directory information 2321 and search the low-order cache 231 for any page corresponding to an address identical to that of the page reserved in the high-order cache 221 (any page not contained in the D-Partition 222 (any page exhibiting a D-Partition flag having a value of "No" in FIG. 11)), or any empty page in the low-order cache 231, via the data access unit 283 (step S301 in FIG. 15).

If it is determined as a result of search in step S301 that any page corresponding to an address identical to that of the page reserved in the high-order cache 221 is present in the low-order cache 231 (Yes in step S302 of FIG. 15), the access request processing unit 281 executes a process in step S309 and subsequent processes.

If it is determined as a result of search in step S301 that any page corresponding to an address identical to that of the page reserved in the high-order cache 221 is absent in the low-order cache 231 (No in step S302 of FIG. 15), the access request processing unit 281 executes a process in step S303 and subsequent processes.

If it is determined as a result of search in step S303 that any empty page is present in the low-order cache 231 (Yes in step S303 of FIG. 15), the access request processing unit 281 reserves an arbitrary empty page in the low-order cache 231 to store the data of a page to be replaced from (thrown out of) the high-order cache 221, via the data access unit 283 (step S304 in FIG. 15).

If it is determined as a result of search in step S303 that any empty page is absent in the low-order cache 231 (No in step S303 of FIG. 15), the access request processing unit 281 refers to the subordinate directory information 2321 to select a page used to store the data of a page to be replaced from (thrown out of) the high-order cache 221 upon storage of new data, from arbitrary pages of the low-order cache 231. At this time, the access request processing unit 281 also refers to the access table 284 to exclude the page currently being accessed, from the targets to be selected as pages to be replaced from (thrown out of) the high-order cache 221 (step S305 in FIG. 15).

If the page selected in step S305 remains to be updated (the value of the UPDATED flag of the selected page is "No" in the subordinate directory information 2321 illustrated in FIG. 12; Yes in step S306 of FIG. 15), the access request processing unit 281 executes a process in step S308 and subsequent processes.

If the page selected in step S305 has been updated (the value of the UPDATED flag of the selected page is "Yes" in the subordinate directory information 2321 illustrated in FIG. 12; No in step S306 of FIG. 15), the access request processing unit 281 writes the data of the low-order cache 231 selected in step S305 onto the storage medium 21 to reflect the update, via the data access unit 283 (step S307 in FIG. 15).

The access request processing unit 281 updates the subordinate directory information 2321 stored in the D-Partition 222 and the D-Vol 232 of the secondary high-speed storage device 23 and deletes the data of the page of the low-order cache 231 selected in step S305, via the data access unit 283 (step S308 in FIG. 15).

The access request processing unit 281 copies the data of the page reserved to store new data in the high-order cache 221 to the page of the low-order cache 231 selected in step S305, via the data access unit 283. In doing this, the access request processing unit 281 copies information contained in the ancestor directory information 223 and corresponding to the page of the high-order cache 221, the data of which is copied to the page of the low-order cache 231, to subordinate directory information (for example, a page entry corresponding to the D-Partition 222 of the low-order cache 231) (step S309 in FIG. 15).

The access request processing unit 281 accesses the ancestor directory information 223 via the data access unit 283 to delete the data of the page of the high-order cache 221 reserved to store new data and set this page as an empty page. The access request processing unit 281 updates the information associated with a page which stores the data of a page thrown out of the low-order cache 231 of the subordinate directory information 2321 stored in the D-Partition 222 and the D-Vol 232 of the secondary high-speed storage device 23, via the data access unit 283 (step S310 in FIG. 15).

The processes in steps S221 to S230 in FIG. 14 are executed to complete an operation of reserving a page not contained in the D-Partition 222 of the pages contained in the high-order cache 221, for new data to be stored, in step S226.

<Operation of Reading Directory Information of Low-Order Cache>

Figure 16:
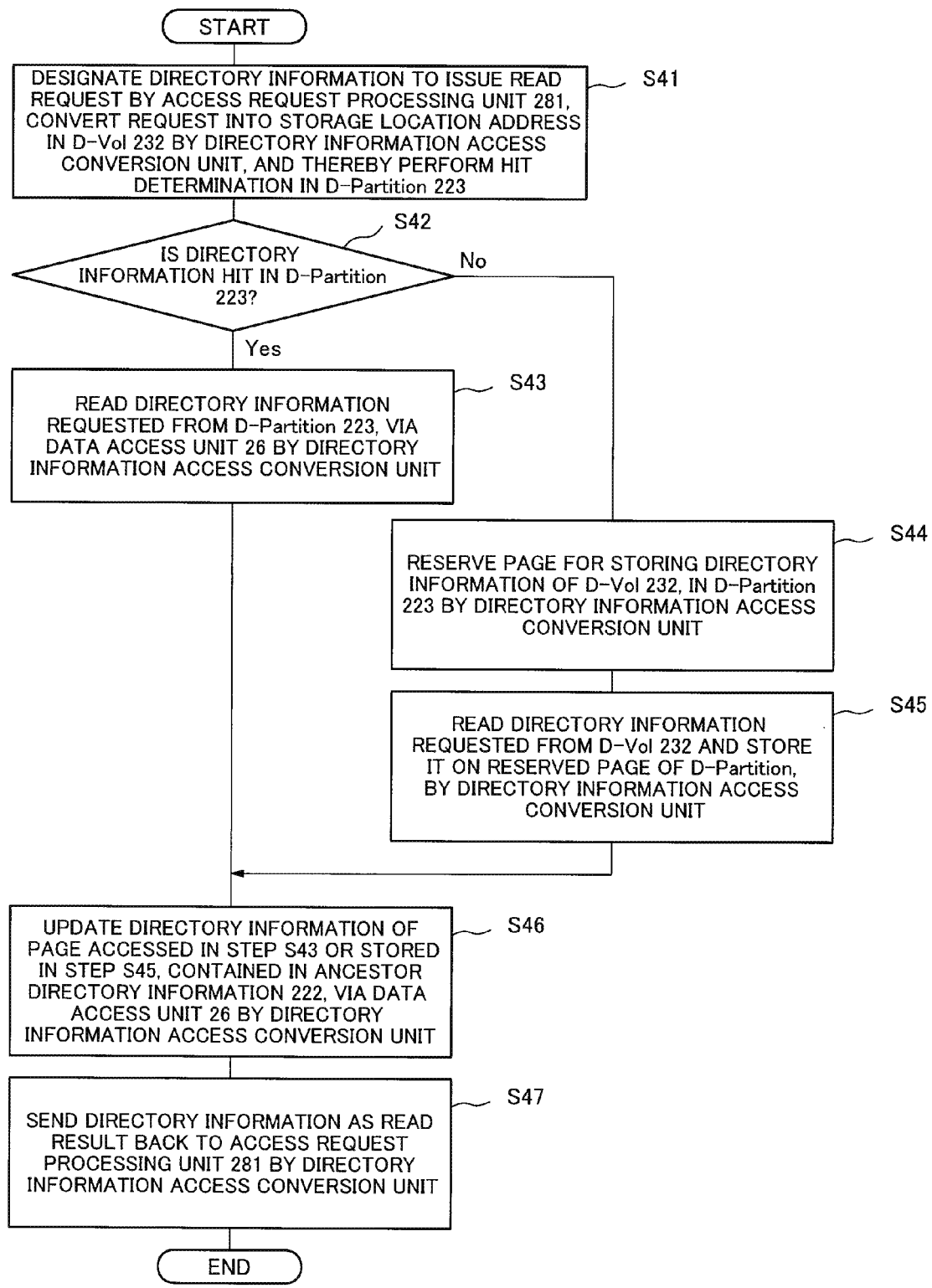
FIG. 16 is a flowchart illustrating a procedure for reading the directory information of the low-order cache in the exemplary embodiment of the present invention.

FIG. 16 is a flowchart for explaining a process of reading the directory information of the low-order cache in step S104 of FIG. 13 and step S301 of FIG. 15. In step S301 of FIG. 15, the access request processing unit 281 searches the low-order cache 231 for any page corresponding to an address identical to that of the page reserved in the high-order cache 221 or any empty page in the low-order cache 231, as described earlier. An operation of reading the subordinate directory information (2321 in FIG. 12) that is the directory information of the low-order cache 231 via the directory information access conversion unit 282 in step S104 of FIG. 13 and step S301 of FIG. 15 will be described below with reference to FIGS. 2, 3, and 16.

The access request processing unit 281 issues a read request to the directory information access conversion unit 282 by designating information (identifier) such as an address, for uniquely specifying required information, from the subordinate directory information (2321 in FIG. 12).

The directory information access conversion unit 282 converts the identifier into an address at which the directory information specified by the identifier in the D-Vol 232 of the secondary high-speed storage device 23 is stored.

The directory information access conversion unit 282 accesses the ancestor directory information 223 of the primary high-speed storage device 22 via the data access unit 283 to determine whether a page containing directory information to be read (the corresponding directory information of the low-order cache 231) is stored in the D-Partition 222 (hit determination) (step S41 in FIG. 16).

If it is determined based on the ancestor directory information 223 of the primary high-speed storage device 22 that a page containing the requested directory information is stored in the D-Partition 222 (a hit is determined; Yes in step S42 of FIG. 16), the directory information access conversion unit 282 reads the hit page (a page containing the directory information of the low-order cache 231) from the D-Partition 222 via the data access unit 283, and executes a process in step S46 of FIG. 16 and subsequent processes (step S43 in FIG. 16).

If the requested directory information is missed in the D-Partition 222 (No in step S42 of FIG. 16), the directory information access conversion unit 282 reserves in the D-Partition 222, a page for storing a copy of the subordinate directory information (2321 in FIG. 12) stored in the D-Vol 232 of the secondary high-speed storage device 23 (step S44 in FIG. 16). In reserving this page, the directory information access conversion unit 282 may select a page having a value indicating the first level of priority of replacement from the pages stored in the D-Partition 222 (pages having an INVALID flag of "No" and a D-Partition flag of "Yes" in the ancestor directory information 223 illustrated in FIG. 11), based on the ancestor directory information 223 of the primary high-speed storage device 22. In the ancestor directory information 223 illustrated in FIG. 11, if the priority level of replacement of each page is higher as it takes larger (smaller) values, pages having larger (smaller) values are selected as the targets to be replaced.

The directory information access conversion unit 282 reads the data requested of the D-Vol 232 of the secondary high-speed storage device 23, via the data access unit 283. The directory information access conversion unit 282 stores the data read from the D-Vol 232 of the secondary high-speed storage device 23, on the page reserved to store a copy of the subordinate directory information in the D-Partition 222 of the primary high-speed storage device 22.

If the page reserved to store a copy of the subordinate directory information in the D-Partition 222 has been updated before the reservation and the update result is not reflected (this page has an INVALID flag of "No," a D-Partition flag of "Yes," an UPDATED flag of "Yes," and a value indicating the first level of priority of replacement in the ancestor directory information 223 illustrated in FIG. 11), the directory information access conversion unit 282 reflects the update details (subordinate directory information) of this page on the information of a corresponding page entry in the subordinate directory information (see FIG. 12) contained in the D-Vol 232 of the secondary high-speed storage device 23, before a copy of the subordinate directory information is stored on this page (step S45 in FIG. 16).

The directory information access conversion unit 282 updates the directory information of the page hit in the D-Partition 222 (the page corresponding to Yes in step S42 of FIG. 16) or the page stored in the D-Partition 222 (the page stored in the D-Partition 222 in step S45 of FIG. 16), of the information (see FIG. 11) of the pages contained in the ancestor directory information 223 of the primary high-speed storage device 22, via the data access unit 283 (step S46 in FIG. 16). The priority level of replacement (FIG. 11) of the corresponding page of the ancestor directory information 223 is set to a value (a value indicating the lowest priority level of replacement) corresponding to, for example, the MRU (Most Recently Used) page. If the UPDATED flag of the directory information of the corresponding page is Yes (UPDATED), this flag is set to No (NON-UPDATED).

The directory information access conversion unit 282 sends the read result of the subordinate directory information that is the requested directory information of the low-order cache 231 back to the access request processing unit 281, and ends the process (step S47 in FIG. 16).

The above-mentioned processes in steps S41 to S47 are executed to complete an operation of reading the subordinate directory information (2321 in FIG. 12) that is the directory information of the low-order cache 231 via the processes by the directory information access conversion unit 282 in step S104 of FIG. 13 and step S301 of FIG. 15.

<Operation of Updating (Writing) Directory Information of Low-Order Cache>

Figure 17:
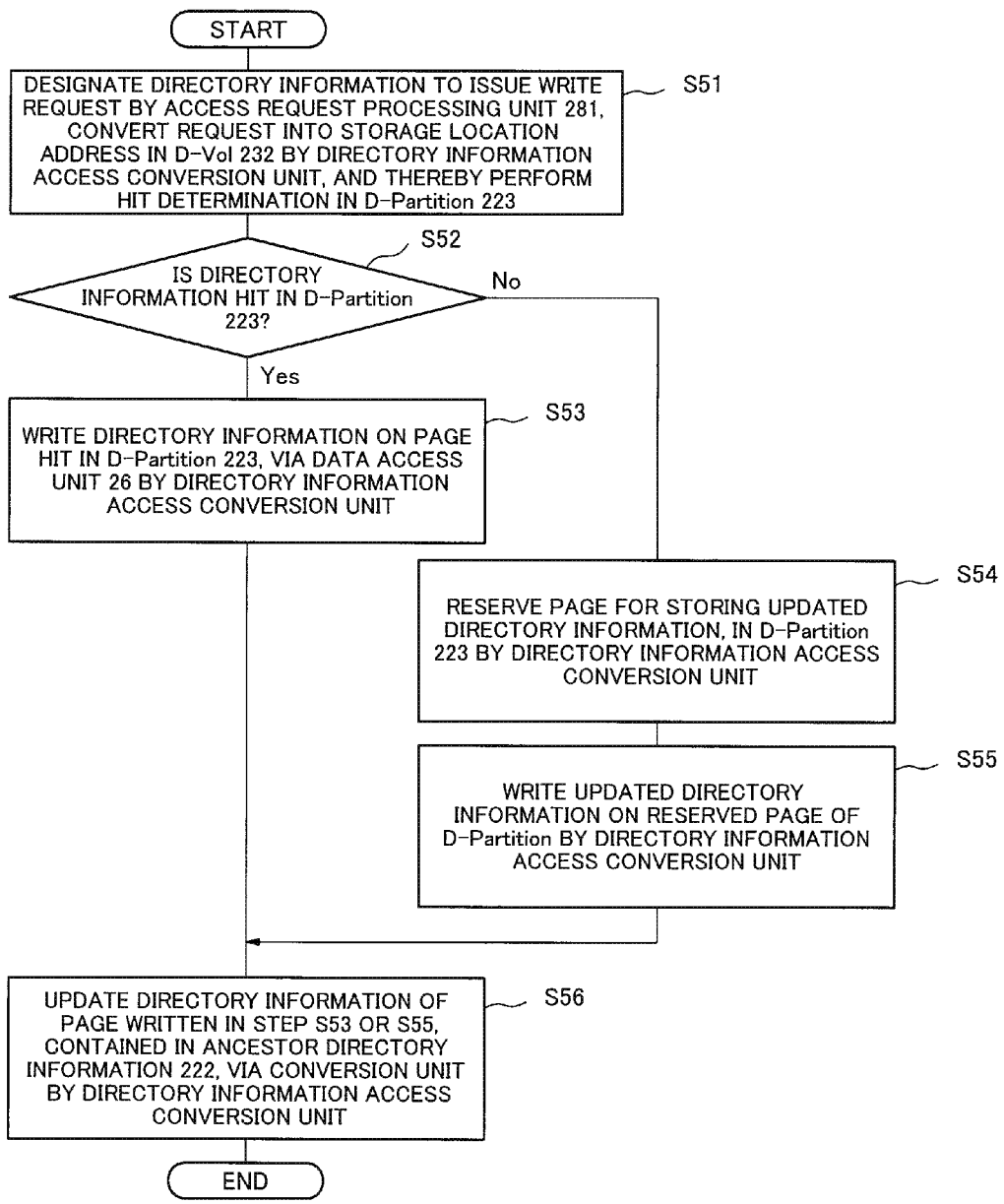
FIG. 17 is a flowchart illustrating a procedure for writing the directory information of the low-order cache in the exemplary embodiment of the present invention.

FIG. 17 is a flowchart for explaining a process of updating (writing) the directory information of the low-order cache in step S109 of FIG. 13 and step S310 of FIG. 15. The subordinate directory information (2321 in FIG. 12) that is the directory information of the low-order cache 231 is updated via the directory information access conversion unit 282 in step S109 of FIG. 13 and step S310 of FIG. 15. A process of updating the directory information of the low-order cache will be described below with reference to FIGS. 2, 3, and 17. Since the update of the subordinate directory information involves an operation of writing update information (subordinate directory information), write is synonymous with update in FIG. 17 and other Figures.

The access request processing unit 281 issues an update request to the directory information access conversion unit 282 by designating an identifier such as an address, for uniquely specifying information to be updated, from the subordinate directory information (2321 in FIG. 12). The directory information access conversion unit 282 converts the identifier into an address at which the directory information specified by the identifier in the D-Vol 232 is stored. The directory information access conversion unit 282 accesses the ancestor directory information 223 of the primary high-speed storage device 22 via the data access unit 283 to determine whether a page containing the directory information requested to be updated (subordinate directory information) is stored in the D-Partition 222 (hit determination) (step S51 in FIG. 17).

If a page containing the directory information requested to be updated (subordinate directory information) is stored in the D-Partition 222 (a hit is determined; Yes in step S52), the directory information access conversion unit 282 updates (writes on) the hit page stored in the D-Partition 222, via the data access unit 283, and executes a process in step S56 and subsequent processes (step S53 in FIG. 17).

If no page containing the directory information requested to be updated (subordinate directory information) is stored in the D-Partition 222 (a miss is determined; No in step S52), the directory information access conversion unit 282 reserves in the D-Partition 222, a page for storing the update details of the subordinate directory information 2321 stored in the D-Vol 232 of the secondary high-speed storage device 23 (step S54 in FIG. 17). In reserving this page, a page having a value indicating the first level of priority of replacement may be selected from the pages stored in the D-Partition 222 (pages having an INVALID flag of "No" and a D-Partition flag of "Yes" in the ancestor directory information 223 illustrated in FIG. 11), based on the ancestor directory information 223 of the primary high-speed storage device 22. The directory information access conversion unit 282 stores in the D-Partition 222, the updated subordinate directory information on the page for storing the update of the subordinate directory information 2321, via the data access unit 283.

If the page reserved to store the update result of the subordinate directory information of the D-Partition 222 replaced has been updated (this page has an INVALID flag of "No," a D-Partition flag of "Yes," an UPDATED flag of "Yes," and a value indicating the first level of priority of replacement in the ancestor directory information 223 illustrated in FIG. 11), the updated details of this page are reflected on the information of a corresponding page entry in the subordinate directory information (see FIG. 12) contained in the D-Vol 232 of the secondary high-speed storage device 23, before the subordinate directory information is written on this page (step S55 in FIG. 17).

The directory information access conversion unit 282 updates the subordinate directory information (see FIG. 12) of the page hit in the D-Partition 222 (the page hit in step S53 of FIG. 17) or the page stored in the D-Partition 222 (the page stored in the D-Partition 222 in step S55 of FIG. 17), contained in the ancestor directory information 223, via the data access unit 283 (step S56 in FIG. 17).

The above-mentioned processes in steps S51 to S56 are executed to complete an operation of updating the subordinate directory information 2321 that is the directory information of the low-order cache 231 via the directory information access conversion unit 282 in steps S109 and S310.

<Reservation of Page for Storing New Page in D-Partition>

Figure 18:
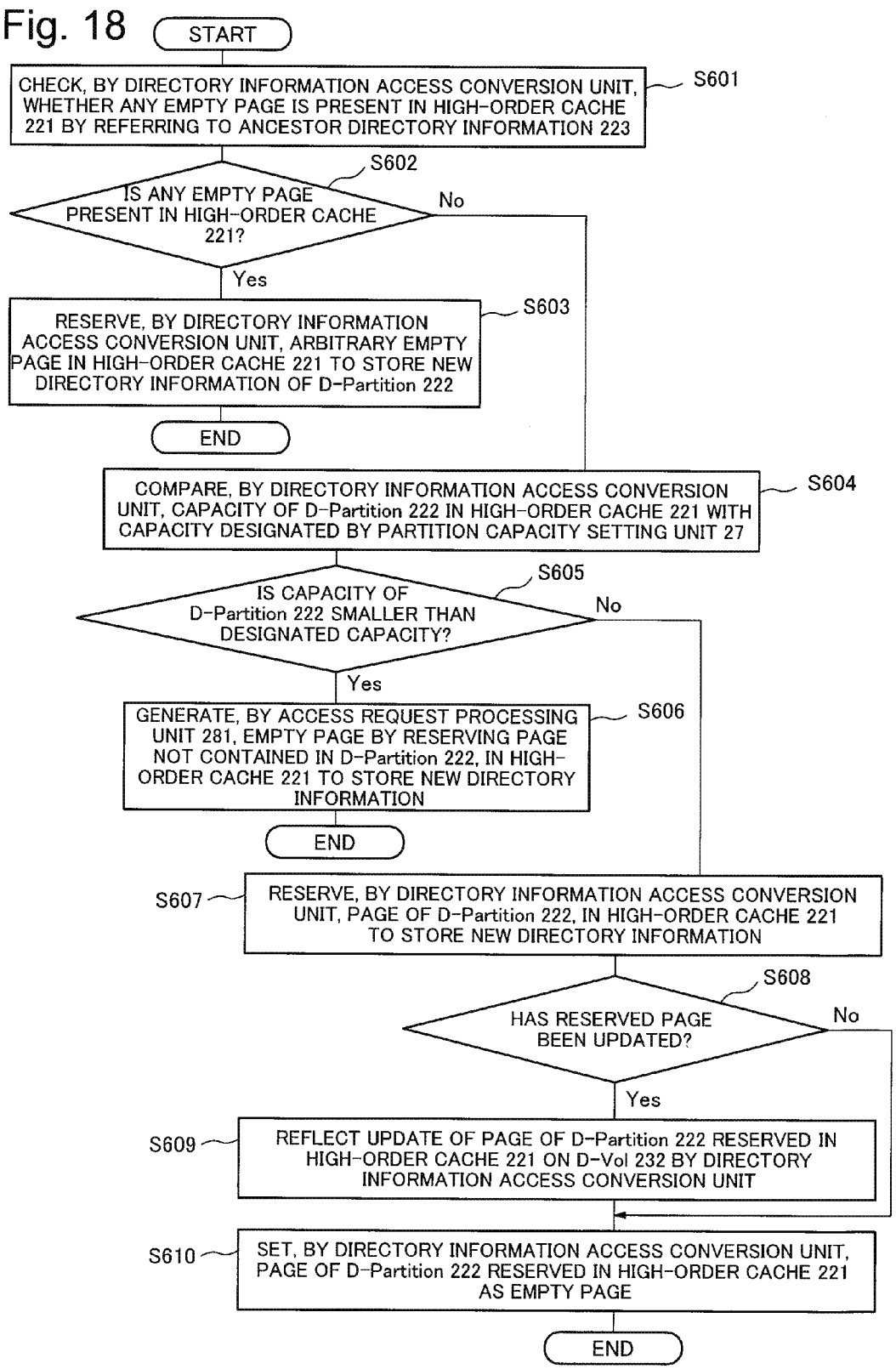
FIG. 18 is a flowchart illustrating a procedure for reserving a page for storing new data in the D-Partition according to the exemplary embodiment of the present invention.

FIG. 18 is a flowchart for explaining a process of reserving a page for storing a new page in the D-Partition in step S44 of FIG. 16 and step S54 of FIG. 17. In step S44 of FIG. 16 and step S54 of FIG. 17, a page for caching the subordinate directory information 2321 is reserved in the D-Partition 222. A process of reserving a page for caching the subordinate directory information 2321 (FIG. 12) in the D-Partition 222 will be described below with reference to FIGS. 2, 3, and 18.

The directory information access conversion unit 282 refers to the ancestor directory information 223 via the data access unit 283 to check whether any empty page (any page having an INVALID flag of "Yes") is present in the high-order cache 221 (step S601 in FIG. 18).

If it is determined in step S601 of FIG. 18 that any empty page is present in the high-order cache 221 (Yes in step S602 of FIG. 18), the directory information access conversion unit 282 reserves an arbitrary empty page of the high-order cache 221 as a page for storing a copy of some of the subordinate directory information 2321 (FIG. 12) (a page for storing the subordinate directory information) in the D-Partition 222, and ends the process (step S603 in FIG. 18).

If it is determined in step S601 of FIG. 18 that any empty page is absent in the high-order cache 221 (No in step S602 of FIG. 18), the directory information access conversion unit 282 compares the capacity of the D-Partition 222 obtained based on the ancestor directory information 223 with the capacity of the D-Partition 222 determined by the capacity control unit 27, via the data access unit 283 (step S604 in FIG. 18).

If it is determined in step S604 of FIG. 18 that the capacity of the D-Partition 222 is smaller than the capacity value determined by the capacity control unit 27 (Yes in step S605 of FIG. 18), the directory information access conversion unit 282 requests the access request processing unit 281 to reserve a required number of pages from pages not contained in the D-Partition 222 (pages exhibiting a D-Partition flag having a value of "No" in the ancestor directory information 223 (FIG. 4)) of the pages contained in the high-order cache 221, and delete the data of these pages to generate empty pages, so that the empty pages are used to store new data, and ends the process (step S606 in FIG. 18).

The procedure of a process of reserving, by the access request processing unit 281 in step S603 of FIG. 18, any page not contained in the D-Partition 222 of the pages contained in the high-order cache 221 to store new data is the same as in the processes in steps S301 to S310 of FIG. 15, and a description thereof will not be given.

If it is determined in step S604 of FIG. 18 that the capacity of the D-Partition 222 is equal to or larger than the capacity value determined by the capacity control unit 27 (No in step S605 of FIG. 18), the directory information access conversion unit 282 selects any page to be replaced from the pages contained in the D-Partition 222 (pages exhibiting a D-Partition flag having a value of "Yes" in the ancestor directory information 223 (FIG. 4)) of the pages contained in the high-order cache 221, to reserve a page for storing new data (step S607 in FIG. 18). In reserving a page for storing new data of the pages contained in the D-Partition 222, a least recently used page at this point of time may be selected.

If it is determined based on the directory information (FIG. 4) recorded in the ancestor directory information 223 that the page reserved in step S607 remains to be updated (has not been updated) (the UPDATED flag of the ancestor directory information 223 (FIG. 4) takes a value of No; No in step S608 of FIG. 18), a process in step S610 and subsequent processes are executed.

If it is determined based on the directory information recorded in the ancestor directory information 223 that the page reserved in step S607 has been updated (the UPDATED flag of the ancestor directory information 223 (FIG. 4) takes a value of Yes; Yes in step S608 of FIG. 18), the directory information access conversion unit 282 reflects the update on a page of the D-Vol 232 of the secondary high-speed storage device 23 corresponding to the page contained in the D-Partition 222 and reserved in step S607, via the data access unit 283 (step S609 in FIG. 18).

The directory information access conversion unit 282 deletes the data of the page contained in the D-Partition 222 and reserved in step S607 and sets this page as an empty page to store new data, via the data access unit 283. The directory information access conversion unit 282 updates the ancestor directory information 223 and sets the reserved corresponding page as an empty page, via the data access unit 283, and ends the process (step S610 in FIG. 18).

The above-mentioned processes in steps S601 to S610 are executed to complete an operation of reserving a page for caching the subordinate directory information 2321 (FIG. 12) in the D-Partition 222, in steps S44 and S54.

Example

An exemplary effect obtained in this exemplary embodiment will be given by taking as an example, a capacity allocation optimum in terms of performance between the high-order cache 221 and D-Partition 222 of the primary high-speed storage device 22 in the optimum capacity allocation search unit 26. In this exemplary Example, the sum of the capacities available for the high-order cache 221 and D-Partition 222 of the storage medium 21 is set to 2 GB (Gigabytes) (=2048 MB (Megabytes)), and the capacity allocation between the high-order cache 221 and the D-Partition 222 is changed in units of 256 MB. Each access is assumed to be performed in units of pages, and the optimum capacity allocation search unit 26 changes the capacity allocation of the storage medium 21 between the high-order cache 221 and the D-Partition 222 every access to 30000 pages.

In this exemplary Example, assume that the primary high-speed storage device 22 is implemented in a DRAM and the secondary high-speed storage device 23 is implemented in a Flash SSD. Then, the access time shortening effect for each type of cache hit with reference to the case where the directory information obtained upon a hit in the low-order cache 231 is read from the D-Vol 232 is represented by a cache hit type-specific access time shortening effect 61, as illustrated in FIG. 8. The time is shorter by 200 μs (microseconds) when a hit is obtained in the high-order cache 221 than when a hit is obtained in the low-order cache 231. The time is shorter by 100 μs (microseconds) when a hit is obtained in the D-Partition 222 (the subordinate directory information to be accessed is stored in the D-Partition 222) than when a hit is obtained in the low-order cache 231.

FIG. 9 illustrates in (A) and (B), a high-order cache lower limit capacity distribution 71 and a D-Partition lower limit capacity distribution 72 generated by the capacity-by-capacity cache hit frequency recording unit 25 in this exemplary embodiment. In constant misses in the D-Partition lower limit capacity illustrated in (B) of FIG. 9, the D-Vol 232 is accessed because misses are encountered in the D-Partition 222 illustrated in FIG. 2 (the subordinate directory information is missed). The optimum capacity allocation search unit 26 illustrated in FIG. 2 multiplies the value of the frequency of access of each of the high-order cache lower limit capacity distribution 71 and the D-Partition lower limit capacity distribution 72 by the time shortened per access, shown in the cache hit type-specific access time shortening effect 61, to calculate the total time by which the access time is shortened for each allocated capacity. Although the unit of measurement of the frequency of hits is assumed to be 256 MB in FIG. 9, this is merely one specific example. The unit of measurement of the frequency of hits is not limited to 256 MB and can be set arbitrarily, as a matter of course.

FIG. 10 represents the hit counts of the high-order cache 221 and D-Partition 222 and the total access time shortening effect upon access to 30000 pages in each combination of the capacities of the high-order cache 221 and the D-Partition 222 in this exemplary Example. The hit counts in each combination of the capacities of the high-order cache 221 and the D-Partition 222 are obtained from the high-order cache lower limit capacity distribution 71 and the D-Partition lower limit capacity distribution 72 illustrated in FIG. 9. The access time shortening effect is obtained from the cache hit type-specific access time shortening effect 61 illustrated in FIG. 8.

The frequency of hits of the high-order cache 221 in each capacity is obtained from the high-order cache lower limit capacity distribution 71 illustrated in (A) of FIG. 9, in the following way. When the capacity of the high-order cache is, for example, 1024 MB, this frequency of hits is expressed as the frequency of hits for 1024 MB or less, that is, the sum of hit frequencies for 256 MB, 512 MB, 768 MB, and 1024 MB in the high-order cache lower limit capacity distribution 71:

$$10000+4000+3500+3000=20500$$

The frequency of hits of the D-Partition 222 for each capacity is similarly obtained from the D-Partition lower limit capacity distribution 72 illustrated in FIG. 9. However, upon a hit in the high-order cache 221 for each capacity mentioned above, the process ends without access to the D-Partition 222. Therefore, the frequency of hits in the D-Partition 222 for each capacity is obtained by subtracting the hit count in the high-order cache 221.

When the capacity of the D-Partition 222 is, for example, 1024 MB, the capacity of the high-order cache 221 is 1024 MB because the capacity of the primary high-speed storage device 22 is 2048 MB. Hence, the frequency of hits when the capacity of the high-order cache 221 is 1024 MB is subtracted. In other words, subtracting a frequency of hits of 20500 when the capacity of the high-order cache 221 is 1024 MB from a frequency of hits for 1024 MB or less in the D-Partition lower limit capacity distribution 72, as given by:

$$25000+2000+1200+400=28600$$

yields a frequency of hits in the D-Partition 222 as:

$$28600-20500=8100.$$

A sum total T of access time shortening effects obtained by the high-order cache 221 and the D-Partition 222 in each combination of their capacities is given by:

$$T = A \times X + B \times Y$$

where X is the hit count in the high-order cache 221, A is the access time shortening effect per hit in the high-order cache 221, Y is the hit count in the D-Partition 222, and Y is the access time shortening effect per hit in the D-Partition 222.

Allocating, for example, a capacity of 1 GB (=1024 MB) to the high-order cache 221 yields the total time by which the access time is shortened from the cache hit type-specific access time shortening effect 61 illustrated in FIG. 8 and the frequency of hits in the high-order cache 221 illustrated in FIG. 8, as:

20500×200 µs=4100000 µs=4100 ms (milliseconds).

In this case, since the capacity allocated to the D-Partition 222 is 1 GB (=1024 MB), the total time by which the access time is shortened is obtained from the frequency of hits in the D-Partition 222, as:

8100×100 µs=810 ms.

In other words, the sum total of access time shortening effects when a capacity of 1 GB is allocated to each of the high-order cache 221 and the D-Partition 222 can be calculated as:

4100+810=4910 ms.

Calculating the access time shortening effect for each combination of capacity allocation shares between the high-order cache 221 and the D-Partition 222 reveals that a maximum access time shortening effect is obtained by allocating a capacity of 1280 MB to the high-order cache 221 and a capacity of 768 MB to the D-Partition 222. The access time shortening effect in this capacity allocation is obtained as:

21500×200 µs+6700×100 µs=4300000 µs+670000 µs=4970 ms.

Hence, the optimum capacity allocation search unit 26 achieves an allocation optimum in terms of access performance for the primary high-speed storage device 22 by allocating a capacity of 1280 MB to the high-order cache 221 and a capacity of 768 MB to the D-Partition 222.

The disclosure of PTLs 1 to 5 and NPL 1 is hereby incorporated herein by reference in its entirety. The exemplary embodiment or exemplary Example can be changed or adjusted based on the basic technical idea of the present invention within the full disclosure (including the scope of claims) of the present invention. Various combinations or selections of various disclosed elements (including, for example, elements of each claim, elements of each exemplary embodiment or Example, and elements of each figure) can be made without departing from the scope of claims of the present invention. In other words, the present invention obviously incorporates various modifications or corrections which would be made by those skilled in the art in accordance with the full disclosure including the scope of claims and the technical idea.

REFERENCE SIGNS LIST

1 host
2 storage
3 network
21 storage medium
22 first high-speed storage
23 secondary high-speed storage device
24 cache hit type determination unit
25 capacity-by-capacity cache hit frequency recording unit
26 optimum capacity allocation search unit
27 capacity control unit
28 access control unit
29 access control unit
61 cache hit type-specific access time shortening effect
71 high-order cache lower limit capacity distribution
72 D-Partition lower limit capacity distribution
221 high-order cache
222 D-Partition
223 ancestor directory information
224 cache area
231 low-order cache
232 D-Vol
251 high-order cache lower limit capacity distribution
252 D-Partition lower limit capacity distribution
281 access request processing unit
282 directory information access conversion unit
283 data access unit
284 access table
2321 subordinate directory information

What is claimed is:

1. A storage device comprising:
a first storage device including a data writable and readable first storage unit;
a second storage device including a data writable and readable second storage unit,
the first storage device being not slower than the second storage device,
the first storage device further including a first storage area for storing management information for access control and management of the second storage unit, and
the second storage device further including a second storage area for storing management information for access control and management of the second storage unit;
the storage device further comprising circuitry configured to:
retrieve the management information relating to the second storage unit and used for access to the second storage unit from the first storage area of the first storage device, and retrieves the management information relating to the second storage unit from the second storage area of the second storage device when the management information is not stored in the first storage area; and
variably set an allocation between a capacity of the first storage unit and a capacity of the first storage area in the first storage device,
wherein the circuitry is further configured to:
calculate an allocation between a capacity of the first storage unit required to hit an access target in the first storage unit and a capacity of the first storage area required to hit, in the first storage area, the management information relating to the second storage unit;
record hit frequency information for each predetermined capacity for the first storage unit and the first storage area; and
determine a capacity allocation optimum in terms of shortening an access time, based on the hit frequency information, for a combination of capacity allocation shares between the first storage unit and the first storage area.

2. The storage device according to claim 1, wherein, when accessing to the second storage unit with an access target being not stored in the first storage unit for an access request, the circuitry is configured to search for the first storage area of the first storage device and,
if the management information relating to the second storage unit and corresponding to the access is stored in the first storage area, the circuitry is configured to access the second storage unit by referring to the management information relating to the second storage unit and being stored in the first storage area, and
if the management information relating to the second storage unit is not stored in the first storage area, the circuitry is configured to performs control to access the second storage unit by referring to the management information relating to the second storage unit and being stored in the second storage area of the second storage device.

3. The storage device according to claim 1, wherein the circuitry is further configured to determine an allocation between the capacity of the first storage unit and the capacity of the first storage area from predetermined combinations of the capacity of the first storage unit and the capacity of the first storage area, based on analysis of access for the combinations, and
    sets the determined capacity allocation for the first storage unit and the first storage area.

4. The storage device according to claim 1, wherein the circuitry is further configured to determine types of hits that occur in a plurality of combinations of capacity allocation shares between the first storage unit and the first storage area to calculate an allocation between the capacity of the first storage unit and the capacity of the first storage area, which is required to hit an access target in the first storage unit or hit in the first storage area, the management information relating to the second storage unit, based on the determination result of the types of hits for the plurality of combinations of the capacity allocation shares.

5. The storage device according claim 1, wherein the circuitry is further configured to determines the capacity allocation between the first storage unit and the first storage area in the first storage unit every predetermined access count.

6. A storage device comprising:
    a first storage device including a data writable and readable first storage unit;
    a second storage device including a data writable and readable second storage unit,
    the first storage device being not slower than the second storage device,
    the first storage device further including a first storage area for storing management information for access control and management of the second storage unit, and
    the second storage device further including a second storage area for storing management information for access control and management of the second storage unit;
    the storage device further comprising circuitry configured to:
        retrieve the management information relating to the second storage unit and used for access to the second storage unit from the first storage area of the first storage device, and retrieves the management information relating to the second storage unit from the second storage area of the second storage device when the management information is not stored in the first storage area; and
    variably set an allocation between a capacity of the first storage unit and a capacity of the first storage area in the first storage device,
    wherein the circuitry is further configured to determine a capacity allocation optimum in terms of an effect of shortening an access time by a hit, of combinations of the capacity of the first storage unit and the capacity of the first storage area, from a change in hit count that depends on a change in capacity of the first storage unit and from a change in hit count of the management information relating to the second storage unit, which depends on a change in capacity of the first storage area.

7. The storage device according to claim 6, further comprising a storage area for storing management information required for access control and management of the first storage unit, the storage area being provided in one of the first storage device and a storage device equal in access speed to the first storage device.

8. A storage device comprising:
    a first storage device including a data writable and readable first storage unit;
    a second storage device including a data writable and readable second storage unit,
    the first storage device being not slower than the second storage device,
    the first storage device further including a first storage area for storing management information for access control and management of the second storage unit, and
    the second storage device further including a second storage area for storing management information for access control and management of the second storage unit;
    the storage device further comprising circuitry configured to:
        retrieve the management information relating to the second storage unit and used for access to the second storage unit from the first storage area of the first storage device, and retrieves the management information relating to the second storage unit from the second storage area of the second storage device when the management information is not stored in the first storage area; and
    variably set an allocation between a capacity of the first storage unit and a capacity of the first storage area in the first storage device,
    wherein the storage device further comprises:
    a storage medium which stores data stored and held in the storage device,
    wherein the first storage device and the second storage device are more rapid than the storage medium, and
    the first storage unit and the second storage unit store one of a copy and an update detail of some of the data stored in the storage medium.

9. The storage device according to claim 8, wherein
    the first storage unit is a first cache in the first storage device,
    the second storage unit is a second cache in the second storage device,
    the first storage area temporarily retains one of a copy and an update detail of some of the management information relating to the second cache and stored in the second storage area,
    the first cache temporarily retains one of a copy and an update detail of some of the data stored in the storage medium, and
    the second cache temporarily retains data thrown out of the first cache.

10. A method of controlling a storage,
the storage comprising:
    a first storage device comprising a data writable and readable first storage unit; and
    a second storage device comprising a data writable and readable second storage unit,
    the first storage device being not slower than the second storage device,
    wherein in controlling the storage, the first storage device further includes a first storage area for storing management information for access control and management of the second storage unit, and the second storage device further includes a second storage area for storing management information for access control and management of the second storage unit, and the method comprises:

performing control to retrieve the management information relating to the second storage unit and used for access to the second storage unit from the first storage area of the first storage device, and retrieve the management information relating to the second storage unit from the second storage area of the second storage device when the management information is not stored in the first storage area;

variably setting an allocation between a capacity of the first storage unit and a capacity of the first storage area in the first storage device;

in determining the capacity allocation, calculating an allocation between a capacity of the first storage unit required to hit an access target in the first storage unit and a capacity of the first storage area required to hit in the first storage area, the management information relating to the second storage unit;

recording hit frequency information in a storage unit for each predetermined capacity for the first storage unit and the first storage area; and determining a capacity allocation optimum in terms of shortening an access time, based on the hit frequency information, for a combination of capacity allocation shares between the first storage unit and the first storage area.

11. The method of controlling a storage according to claim 10, further comprising:

when accessing to the second storage unit with an access target being not stored in the first storage unit for an access request, if the management information relating to the second storage unit and corresponding to the access is stored in the first storage area, accessing the second storage unit by referring to the management information relating to the second storage unit and being stored in the first storage area, and if the management information relating to the second storage unit is not stored in the first storage area, accessing the second storage unit by referring to the management information relating to the second storage unit and being stored in the second storage area.

12. The method of controlling a storage according to claim 10, further comprising:

in determining the capacity allocation, determining an allocation between the capacity of the first storage unit and the capacity of the first storage area from predetermined combinations of the capacity of the first storage unit and the capacity of the first storage area, based on analysis of access for the combinations, and setting the determined capacity allocation for the first storage unit and the first storage area.

13. The method of controlling a storage according to claim 10, further comprising determining types of hits that occur in a plurality of combinations of capacity allocation shares between the first storage unit and the first storage area to calculate an allocation between the capacity of the first storage unit and the capacity of the first storage area, which is required to hit an access target in the first storage unit or hit in the first storage area, the management information relating to the second storage unit, based on the determination result of the types of hits for the plurality of combinations of the capacity allocation shares.

14. The method of controlling a storage according to claim 10, further comprising changing the capacity allocation between the first storage unit and the first storage area in the first storage unit every predetermined access count.

15. A method of controlling a storage, the storage comprising:

a first storage device comprising a data writable and readable first storage unit; and a second storage device comprising a data writable and readable second storage unit, the first storage device being not slower than the second storage device, wherein in controlling the storage, the first storage device further includes a first storage area for storing management information for access control and management of the second storage unit, and the second storage device further includes a second storage area for storing management information for access control and management of the second storage unit, and the method comprises:

performing control to retrieve the management information relating to the second storage unit and used for access to the second storage unit from the first storage area of the first storage device, and retrieve the management information relating to the second storage unit from the second storage area of the second storage device when the management information is not stored in the first storage area; and variably setting an allocation between a capacity of the first storage unit and a capacity of the first storage area in the first storage device;

determining a capacity allocation optimum in terms of an effect of shortening an access time by a hit, of combinations of the capacity of the first storage unit and the capacity of the first storage area, from a change in hit count that depends on a change in capacity of the first storage unit and from a change in hit count of the management information relating to the second storage unit, which depends on a change in capacity of the first storage area.

16. A method of controlling a storage, the storage comprising:

a first storage device comprising a data writable and readable first storage unit; and a second storage device comprising a data writable and readable second storage unit, the first storage device being not slower than the second storage device, wherein in controlling the storage, the first storage device further includes a first storage area for storing management information for access control and management of the second storage unit, and the second storage device further includes a second storage area for storing management information for access control and management of the second storage unit, and the method comprises:

performing control to retrieve the management information relating to the second storage unit and used for access to the second storage unit from the first storage area of the first storage device, and retrieve the management information relating to the second storage unit from the second storage area of the second storage device when the management information is not stored in the first storage area; and variably setting an allocation between a capacity of the first storage unit and a capacity of the first storage area in the first storage device, wherein the first storage unit is a first cache in the first storage device, the second storage unit is a second cache in the second storage device, the first storage area temporarily retains one of a copy and an update detail of some of the management information relating to the second cache and stored in the second storage area, the first cache temporarily retains one of a copy and an update detail of some of data stored in a storage medium which stores data held in the storage, and the second cache temporarily retains data thrown out of the first cache.

17. In a computer implementing a storage comprising at least:

a first storage device including a data writable and readable first storage unit; and a second storage device including a data writable and readable second storage unit, the first storage device being not slower than the second storage device, the first storage device further comprising a first storage area for storing management information for access control and management of the second storage unit, and the second storage device further comprising a second storage area for storing management information for access control and management of the second storage unit, a non-transitory computer-readable storage medium storing a program for causing the computer to execute:

an access control process of retrieving the management information relating to the second storage unit and used for access to the second storage unit from the first storage area of the first storage device, and retrieving the management information relating to the second storage unit from the second storage area of the second storage device when the management information is not stored in the first storage area; and a capacity control process of variably setting an allocation between a capacity of the first storage unit and a capacity of the first storage area in the first storage device, wherein the capacity control process comprises:

a process of, in determining the capacity allocation, calculating an allocation between a capacity of the first storage unit required to hit an access target in the first storage unit and a capacity of the first storage area required to hit in the first storage area, the management information relating to the second storage unit;

a process of recording in a storage unit, hit frequency information for each predetermined capacity for the first storage unit and the first storage area; and a process of determining a capacity allocation optimum in terms of shortening an access time, based on the hit frequency information, for a combination of capacity allocation shares between the first storage unit and the first storage area.

18. The storage medium according to claim 17, wherein the access control process comprises a process of:

when accessing to the second storage unit with an access target being not stored in the first storage unit for an access request, searching for the first storage area of the first storage device and, if the management information relating to the second storage unit and corresponding to the access is stored in the first storage area, accessing the second storage unit by referring to the management information relating to the second storage unit and being stored in the first storage area, and if the management information relating to the second storage unit is not stored in the first storage area, performing control to access the second storage unit by referring to the management information relating to the second storage unit and being stored in the second storage area of the second storage device.

19. The storage medium according to claim 17, wherein the capacity control process comprises a process of determining an allocation between the capacity of the first storage unit and the capacity of the first storage area from predetermined combinations of the capacity of the first storage unit and the capacity of the first storage area, based on analysis of access for the combinations, and setting the determined capacity allocation for the first storage unit and the first storage area.

* * * * *